US010235002B2

(12) United States Patent
Church et al.

(10) Patent No.: US 10,235,002 B2
(45) Date of Patent: Mar. 19, 2019

(54) TOUCH SENSOR

(71) Applicant: Solomon Systech Limited, Hong Kong (HK)

(72) Inventors: Justin Anthony Church, Whiteley (GB); David Brent Guard, Whiteley (GB)

(73) Assignee: Solomon Systech Limited, Hong Kong (HK)

( * ) Notice: Subject to any disclaimer, the term of this patent is extended or adjusted under 35 U.S.C. 154(b) by 0 days.

(21) Appl. No.: 15/886,862

(22) Filed: Feb. 2, 2018

(65) Prior Publication Data
US 2018/0224964 A1 Aug. 9, 2018

(30) Foreign Application Priority Data
Feb. 9, 2017 (GB) .................................. 1702111.4

(51) Int. Cl.
*G06F 3/044* (2006.01)
*G06F 3/047* (2006.01)
*G06F 3/041* (2006.01)

(52) U.S. Cl.
CPC ............. *G06F 3/044* (2013.01); *G06F 3/047* (2013.01); *G06F 3/0416* (2013.01); *G06F 2203/04103* (2013.01); *G06F 2203/04112* (2013.01)

(58) Field of Classification Search
CPC ...... G06F 3/044; G06F 3/0412; G06F 3/0416; G06F 2203/04111; G06F 3/0414; G06F 2203/04105
See application file for complete search history.

(56) References Cited

U.S. PATENT DOCUMENTS

| 2010/0117993 | A1* | 5/2010 | Kent ..................... G06F 3/0418 345/177 |
| 2010/0156810 | A1 | 6/2010 | Barbier |
| 2013/0234973 | A1 | 9/2013 | Kim et al. |
| 2014/0062934 | A1* | 3/2014 | Coulson .................. G06F 3/044 345/174 |
| 2014/0226089 | A1 | 8/2014 | Guard |
| 2016/0034088 | A1* | 2/2016 | Richards ................. G01L 1/205 345/173 |
| 2016/0098122 | A1 | 4/2016 | Gur |
| 2016/0202797 | A1 | 7/2016 | Cordeiro et al. |
| 2016/0259481 | A1 | 9/2016 | Lee |

FOREIGN PATENT DOCUMENTS

WO 2015136339 A1 9/2015

\* cited by examiner

*Primary Examiner* — Gerald Johnson
(74) *Attorney, Agent, or Firm* — Idea Intellectual Limited; Margaret A. Burke; Sam T. Yip

(57) ABSTRACT

A capacitive touch sensor device comprising set of crossing X and Y electrodes whose crossing points form a two-dimensional array of nodes which define a touch sensitive area. As well as the main electrode spines which cross, referred to as zeroth order electrode branches, the electrodes have higher order branches, some of which interdigitate. By varying the dimensions of the electrode branches, such as width and length, the overall area of the X and Y electrodes can be varied relatively independently of each other. It is therefore possible to produce an electrode pattern in which the self capacitances of the X and Y electrodes have a certain ratio, e.g. unity, and thereby compensate for the aspect ratio of the touch sensitive area, and/or to have a certain absolute value, e.g. in order not to overload a touch-sensor controller to which the sensor is to be connected.

18 Claims, 29 Drawing Sheets

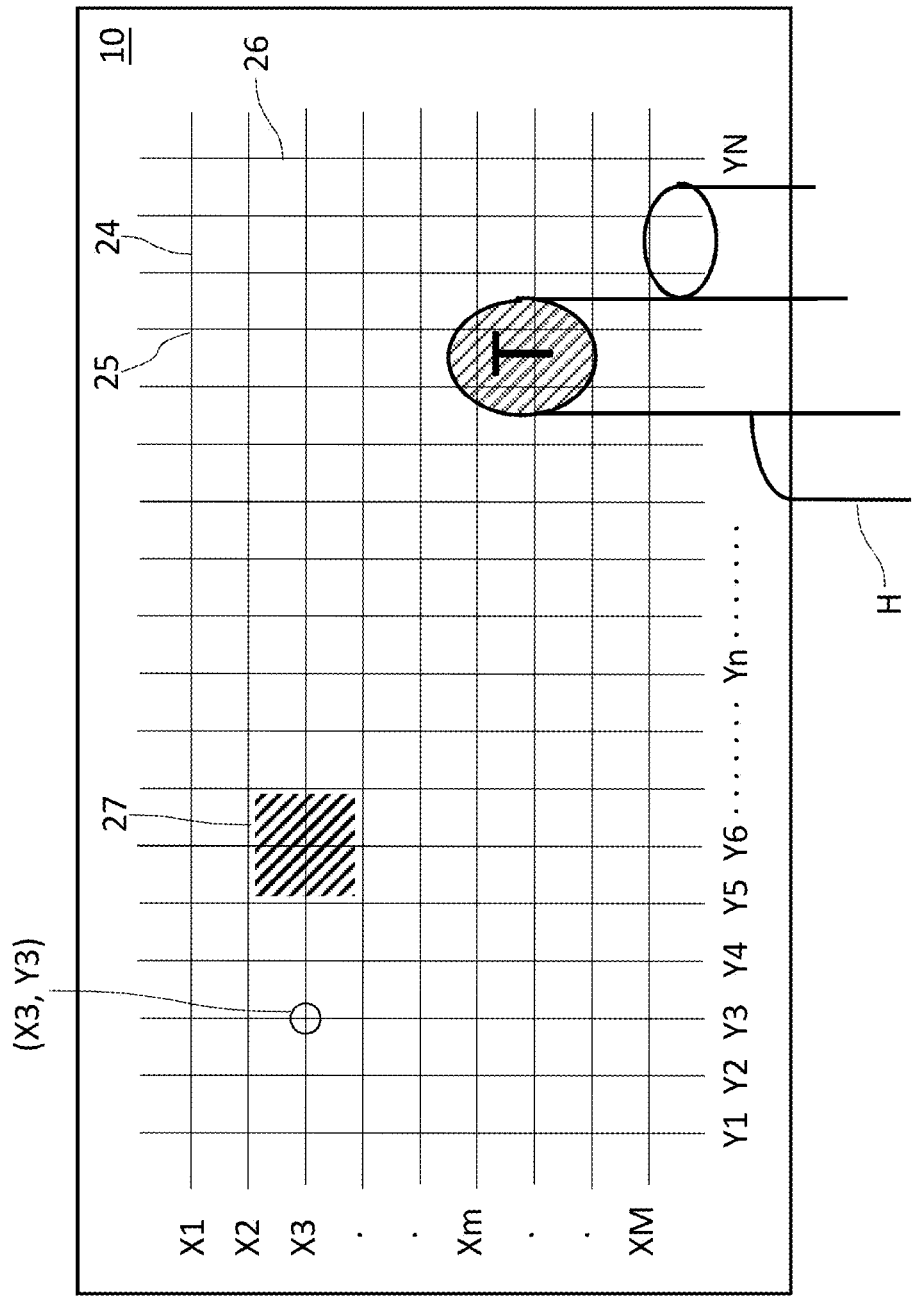

Fig. 7

| Example Pattern Number | Vertical & Horizontal Spine Width* (mesh sq's) | Vertical Finger Width* (mesh sq's) | Horizontal Finger Width* (mesh sq's) | Finger Spacing* (mesh sq's) | Vertical Area (mm²) | Horizontal Area (mm²) | Y Electrode Area (mm²) | X Electrode Area (mm²) | % Area Mismatch | Fill Factor % |
|---|---|---|---|---|---|---|---|---|---|---|
| 1 | 6 | 7 | 4 | 6 | 4,19 | 2,62 | 83,84 | 83,83 | 0,005 | 59 |
| 2 | 10 | 6 | 3 | 2 | 6,18 | 3,86 | 123,63 | 123,64 | 0,004 | 87 |
| 3 | 6 | 10 | 4 | 8 | 3,66 | 2,29 | 73,16 | 73,18 | 0,030 | 52 |
| 4 | 4 | 4 | 8 | 10 | 1,87 | 2,99 | 59,73 | 59,78 | 0,074 | 42 |
| 5 | 10 | 2 | 7 | 8 | 2,39 | 3,82 | 76,45 | 76,50 | 0,064 | 54 |
| 6 | 8 | 7 | 2 | 10 | 3,10 | 1,94 | 61,96 | 62,03 | 0,114 | 44 |
| 7 | 8 | 3 | 8 | 8 | 2,39 | 3,83 | 76,41 | 76,56 | 0,197 | 54 |
| 8 | 4 | 4 | 2 | 6 | 3,06 | 1,92 | 61,29 | 61,10 | 0,303 | 43 |
| 9 | 6 | 8 | 4 | 2 | 6,06 | 3,78 | 121,02 | 121,21 | 0,157 | 86 |
| 10 | 6 | 4 | 2 | 4 | 4,06 | 2,53 | 80,94 | 81,14 | 0,246 | 57 |

*Actual Spine/finger width/spacing is mesh sq's * mesh pitch(μm)

Fig. 9

| Example Pattern Number | Vertical & Horizontal Spine Width* (mesh sq's) | Vertical Finger Width* (mesh sq's) | Horizontal Finger Width* (mesh sq's) | Finger Spacing* (mesh sq's) | Vertical Area (mm²) | Horizontal Area (mm²) | Y Electrode Area (mm²) | X Electrode Area (mm²) | Area Mismatch % | Fill Factor % |
|---|---|---|---|---|---|---|---|---|---|---|
| 1 | 4 | 2 | 10 | 10 | 2,68 | 7,12 | 85,60 | 85,38 | 0,258 | 29 |
| 2 | 10 | 8 | 2 | 2 | 15,62 | 5,85 | 187,25 | 187,48 | 0,120 | 64 |
| 3 | 6 | 3 | 10 | 2 | 6,00 | 16,04 | 191,95 | 192,45 | 0,258 | 65 |
| 4 | 10 | 2 | 10 | 4 | 4,89 | 13,07 | 156,33 | 156,87 | 0,350 | 53 |
| 5 | 6 | 2 | 9 | 8 | 3,33 | 8,83 | 106,63 | 106,01 | 0,588 | 36 |
| 6 | 10 | 9 | 2 | 4 | 13,06 | 4,87 | 155,94 | 156,70 | 0,490 | 53 |
| 7 | 4 | 10 | 3 | 8 | 9,22 | 3,49 | 111,55 | 110,70 | 0,760 | 38 |
| 8 | 6 | 7 | 2 | 2 | 14,68 | 5,47 | 175,02 | 176,11 | 0,618 | 60 |
| 9 | 6 | 10 | 3 | 4 | 13,08 | 4,94 | 158,13 | 156,99 | 0,718 | 53 |
| 10 | 8 | 2 | 9 | 4 | 4,61 | 12,20 | 147,67 | 146,40 | 0,856 | 50 |

*Actual Spine/finger width/spacing is mesh sq's * mesh pitch(μm)

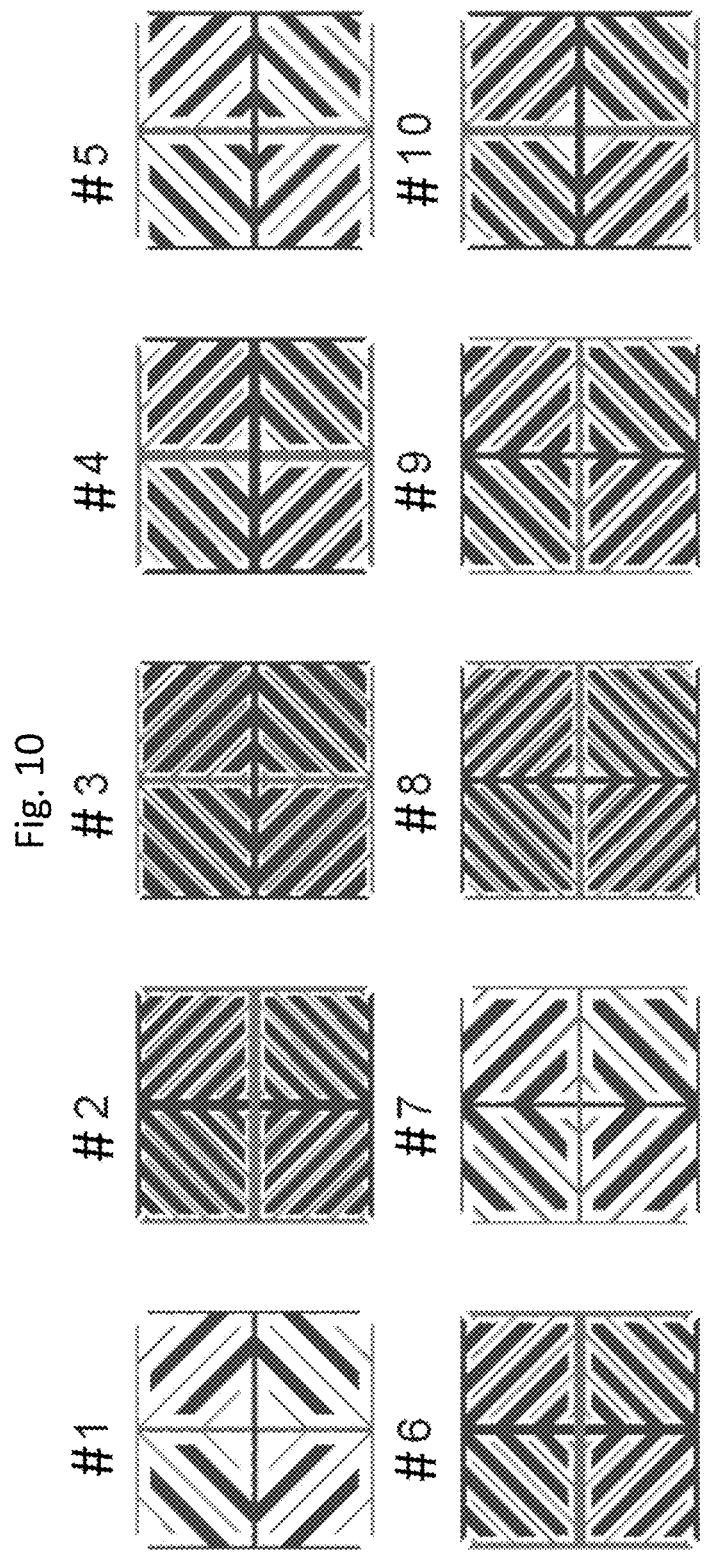

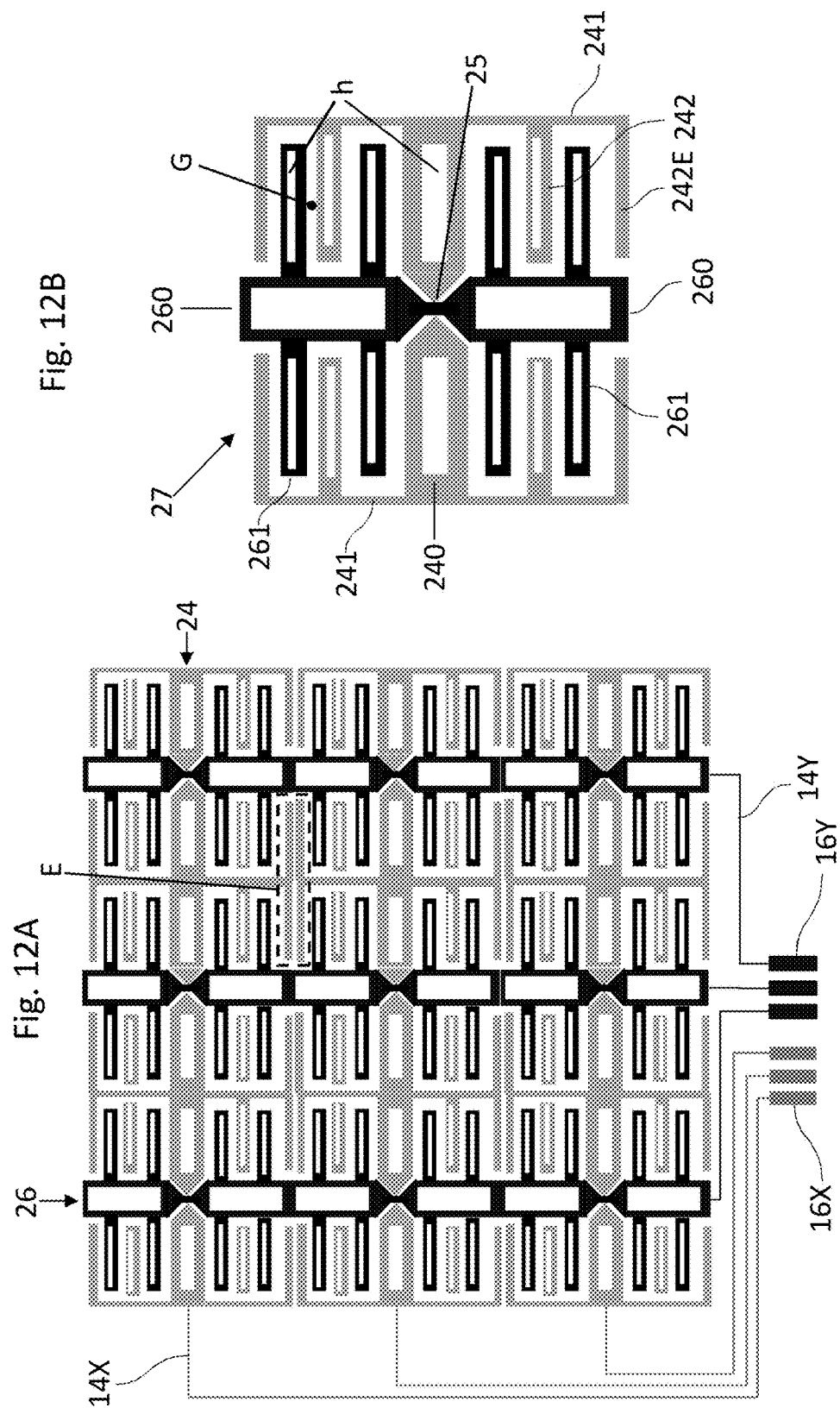

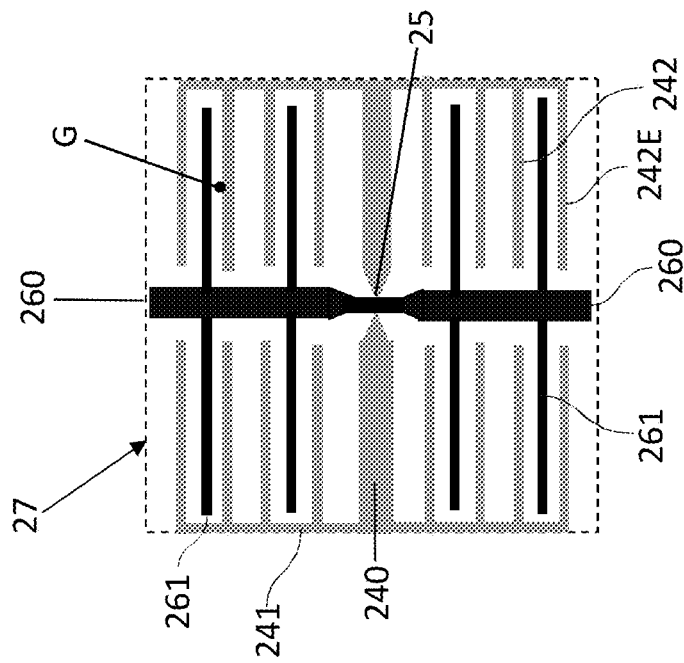
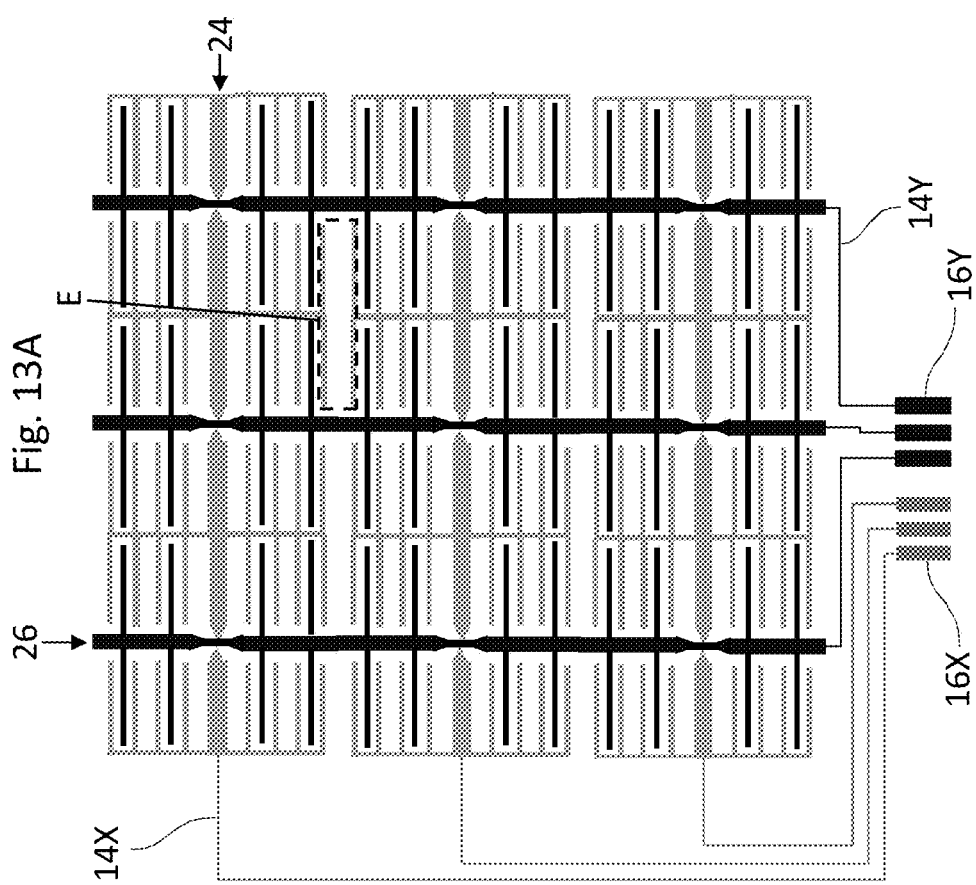
Fig. 13A
Fig. 13B

TOUCH SENSOR

CROSS-REFERENCE TO THE RELATED APPLICATION

This application claims priority to the United Kingdom Patent Application No. GB1702111.4, filed Feb. 9, 2017, the disclosure of which is incorporated herein by reference in their entirety.

FIELD OF THE INVENTION

The present disclosure relates to position-sensitive capacitive touch sensors, more especially, but not exclusively, to capacitive touch sensors integrated with displays to form touch screens.

BACKGROUND

A capacitive touch sensor, referred to simply as a touch sensor in the following, may detect the presence and location of a touch or the proximity of an object (such as a user's finger or a stylus) on a surface. Touch sensors are often combined with a display to produce a touch screen. In other devices, the touch sensors are not combined with a display, e.g. a touch pad of a laptop computer. A touch screen enables a user to interact directly with what is displayed on the screen through a graphical user interface (GUI), rather than indirectly with a mouse or touch pad. A touch sensor may be attached to or provided as part of a mobile phone, tablet or laptop computer, for example.

Touch sensors may be classified into grid and matrix types. In a matrix type, an array of electrodes is arranged on the surface which are electrically isolated from each other, so that each electrode in the array provides its own touch signal. A matrix type touch sensor is therefore naturally suited to situations in which an array of touch-sensitive buttons are needed, such as in a control interface, data entry interface or calculator. In a grid type, there are two groups of parallel electrodes, usually referred to as X and Y electrodes, since they are typically arranged orthogonal to each other. A number of nodes are defined by the crossing points of pairs of X and Y electrodes (as viewed in plan view), where the number of nodes is the product of the number of X electrodes and Y electrodes. A grid type touch sensor is the type typically used for touch screens on mobile phones, drawing tablets and so forth. In earlier designs, the X and Y electrodes are arranged either side of a dielectric layer, so they are vertically offset from each other by the thickness of the dielectric layer, vertical meaning orthogonal to the plane of the stack layers. In more recent designs, to reduce stack thickness, the X and Y electrodes are deposited on the same side of a dielectric layer, i.e. in a single layer, with thin films of dielectric material being locally deposited at the cross-overs to avoid shorting between the X and Y electrodes. A single electrode layer design of this kind is disclosed in US 2010/156810 A1, the entire contents of which are incorporated herein by reference.

Touch sensors may also be classified into self capacitance and mutual capacitance types.

In a self capacitance measurement, the capacitance being measured is between an electrode under a dielectric touch panel and the touching finger, stylus etc., or more precisely the effect that the touch's increase in capacitance with the electrode has on charging a measurement capacitor that forms part of the touch IC's measurement circuit. The finger and the electrode can thus be thought of as acting as the plates of a capacitor with the touch panel being the dielectric.

In a mutual capacitance measurement, adjacent pairs of electrodes are arranged under the touch panel, and form the nominal plates of the capacitor. A touching body acts to modify the capacitance associated with the electrode pair by replacing what was the ambient environment, i.e. in most cases air, but possibly water or some other gas or liquid, with the touching object, which may be effectively a dielectric material (e.g. a dry finger, or a plastics stylus) or in some cases could be conductive (e.g. a wet finger, or a metal stylus). One of the pair of electrodes is driven with a drive signal, e.g. with a burst of pulses, and the other electrode of the pair senses the drive signal. The effect of the touch is to attenuate or amplify the drive signal received at the sense electrode, i.e. affects the amount of charge collected at the sense electrode. Changes in the mutual capacitance between a drive electrode and a sense electrode provide the measurement signal. It is noted that in a mutual capacitance grid sensor, there is a convention to label drive electrodes as the X electrodes and sense electrodes as the Y electrodes, although this choice is arbitrary. A perhaps clearer labelling that is often used is to label the drive electrodes as "Tx" for transmission and the sense electrodes as "Rx" for receiver in analogy to telecoms notation, although this labelling is of course specific to mutual capacitance measurements.

Current industry standard touch screens for mobile phones rely on operating the same touch sensor to make both self capacitance and mutual capacitance measurements, since acquiring both is beneficial to gaining additional information about the touch which can be used in post-processing to increase the reliability of interpretation. For example, mutual capacitance measurement have high noise immunity, whereas self capacitance measurements are easier to interpret and give a direct measure of moisture presence.

Currently, the most common display technologies that are integrated with touch sensors to form a touch screen are thin film transistor (TFT) liquid crystal displays (LCDs) and organic light emitting diode (OLED) displays, and the touch sensor design is a grid design operated to make both self capacitance and mutual capacitance measurements. The grid design patterns the X and Y electrodes in some way designed to achieve the best compromise of competing requirements, such as position sensitivity, lateral field uniformity (for mutual capacitance measurements), fast charging time and so forth. In particular, where the X and Y lines cross, the mutual capacitance is at its largest. To keep this capacitance as low as possible, it is therefore normal practice to narrow the X and Y lines where they cross to keep the area of the capacitor formed by the crossing as small as possible. However, there is a trade off, since these pinch points form the largest resistance elements, and thereby can become the rate limiting factor for charge times. Away from the XY crossing points, it is beneficial for the electrodes to spread out to more or less cover the whole panel sub-area associated with the node. These spread-out areas of the electrodes may be referred to as electrode pads. Having larger area pads improves signal strength for self capacitance measurements and, for mutual capacitance measurements, means that signal contributions can be obtained from touches across the node sub-area. A conventional electrode pattern therefore combines narrow crossing points and spread-out electrode pads in between crossing points.

FIG. 30 of the accompanying drawings shows in plan view a currently popular electrode pattern design for a hybrid self/mutual capacitance sensor, which is referred to as the diamond pattern in the art. US 2010/156810 A1 discloses diamond pattern touch sensors of this kind.

The electrode pattern comprises rows of parallel X lines X2, X3, X4, X5 (hatched) and orthogonal thereto columns of parallel Y lines (cross-hatched), Y3, Y4, Y5, Y6, Y7. The X and Y lines cross at nodes 28 where the X and Y lines are narrowed to respective widths $W_{SX}$ and $W_{SY}$ with the X line lying above the Y line. There is a vertical separation between the X and Y electrodes at the crossing point provided by a dielectric layer or film. The area of the crossing point is thus $W_{SX} \cdot W_{SY}$. Each X electrode may be viewed as having a spine 30, and each Y electrode a spine 32. Away from the bridges, the electrodes expand out into square pads, which are referred to as diamonds since the square shape is arranged at 45 degrees to X and Y. Each electrode is thus a series of diamond-shaped pads interconnected with short bridging strips. A given node has an associated sub-area of the panel, which is illustrated for node (X3, Y5) with the box 27.

In a diamond pattern, the touch locations which are used as benchmarks in performance testing are as follows:

On Node: touching on a spine crossing-point 28;
On X: touching on the middle of a diamond in line with an X electrode spine 30, i.e. on the X electrode spine at the farthest point away from two adjacent crossing points, labelled 31 in the figure;
On Y: touching in the middle of a diamond in line with a Y electrode spine 32, i.e. on the Y electrode spine at the farthest point away from two adjacent crossing point, labelled 33 in the figure;
Off Node: touching at the farthest point away from the two adjacent X spines and two adjacent Y spines, labelled as 29 in the figure.

With the diamond pattern, an "On X" or "On Y" touch represent the areas of lowest field strength for a mutual capacitance measurement, i.e. the lowest sensitivity. For other patterns, this statement can be generalised to the field strength, and hence sensitivity, being the lowest in the interior of electrodes the further the touch lies away from the gaps between paired drive and sense electrodes.

FIG. 31A is a schematic cross-section through a touch panel in a plane perpendicular to the plane of the stack showing a mutual capacitance measurement involving an individual pair of X (drive) and Y (sense) electrodes: Xn, Yn. Electric field lines are shown schematically with the arrow-headed, curved lines. As can be seen from the schematic depiction, field strength at the touch surface is highest in the region adjacent the gap between the X and Y electrodes and decreases towards the interior of each electrode.

FIG. 31B is a schematic cross-section through the same touch panel as FIG. 31A in the same plane showing a self capacitance measurement involving the same pair of X and Y electrodes: Xn, Yn. Electric field lines are shown schematically with the arrow-headed lines. As can be seen from the schematic depiction, field strength across the node area is substantially constant. In other words there is no, or only insubstantial, lateral field non-uniformity. It is also noted in passing, that in self capacitance mode, a small area touch On X (or On Y) totally confined within one of the X electrode pads (or Y electrode pads), e.g. at point 31 (or 33), will provide no signal for any of the Y electrodes (or X electrodes), so position information in the Y direction (or the X direction) will be completely absent from the signal.

BRIEF SUMMARY OF THE INVENTION

According to one aspect of the disclosure, there is provided a device incorporating a capacitive touch sensor, the device comprising:

a touch panel having on an upper side a touch surface and on a lower side an internal surface, the touch panel being made of a dielectric material;

a set of X electrodes arranged under the touch panel and having a zeroth order branch extending in an x direction;

a set of Y electrodes arranged under the touch panel and having a zeroth order branch extending in a y direction different from the x direction, such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3, wherein the ratio of the area covered by each of the X electrodes to the area covered by each of the Y electrodes is matched to lie within 20% of the aspect ratio of the touch sensitive area, so that the self capacitance of each of the X electrodes and the self capacitance of each of the Y electrodes are at least approximately the same.

The electrode area ratio, i.e. the ratio of the X electrode area to the Y electrode area, is matched to lie within at least one of ±2%, ±4%, ±6%, ±8%, ±10%, ±12%, ±14%, ±16% and ±18% of the aspect ratio of the touch sensitive area.

It is noted that the aspect ratio is in most cases equal to the ratio of the number of rows and columns of X and Y electrodes.

In some embodiments, each node is associated with a sub-area bounded by adjacent zeroth order X and Y electrode branches, and wherein, in each sub-area, the ratio of the area covered by the X electrodes to the area covered by the Y electrodes is at least approximately the same as the inverse of the aspect ratio of the touch sensitive area.

The area covered by the X (Y) electrodes can be varied in absolute terms or in relative terms to the area covered by the Y (X) electrodes by undertaking one or more of the following measures: having different widths in X and Y for the zeroth order branches; providing at least one of the X and Y zeroth order branches with internal microstructure, e.g. mesh, which includes micro-areas absent of conductive material that are enclosed by conductive material; wherein the proportion of micro-areas in the zeroth order X and Y branches are different.

In some embodiments, the X and Y electrodes each further comprise higher order branches of order n, each of which is confined to the sub-area into which it buds, where order n is a positive integer and where an nth order branch buds from an (n−1)th order branch, so that, away from edges of the node array, each node is associated with four sub-areas.

By appropriate design of the higher order branches, the area covered by the X (Y) electrodes can be varied in absolute terms or in relative terms to the area covered by the Y (X) electrodes by undertaking one or more of the following measures: having different widths in X and Y for the higher order branches; having different lengths in X and Y for the higher order branches; having different numbers in X and Y for the higher order branches; providing at least one of the X and Y higher order branches with internal microstructure which includes micro-areas absent of conductive material that are enclosed by conductive material; and providing the X and Y higher order branches with internal microstructure which includes micro-areas absent of conductive material that are enclosed by conductive material, wherein the proportion of micro-areas in the higher order X and Y branches are different. In each sub-area, at least some of the higher order X and Y branches may extend alongside one another separated by a gap suitable for making a mutual capacitance measurement of a touching object impinging on the touch surface. The co-extending higher order X and Y branches may comprise at least one of first, second, third etc. order branches of one of X and Y and at least one of first, second, third etc. order branches of one of Y and X respectively.

In some embodiments, the zeroth and higher order branches represent macrostructure of an overall electrode pattern formed by the X and Y electrodes in a conductive material, and wherein there are further areas of said conductive material that are arranged to fill in gaps in the electrode pattern such that said further areas of said conductive material remain electrically isolated from the X and Y electrodes. These further areas of so-called infill may fill in holes in electrodes and/or gaps between electrodes.

In some embodiments, the capacitive touch sensor is combined with a display configured to operate in conjunction with the capacitive touch sensor and thereby form a touch screen.

According to another aspect of the disclosure, there is provided a method of manufacturing a device incorporating a capacitive touch sensor, the method comprising:

providing a touch panel having on an upper side a touch surface and on a lower side an internal surface, the touch panel being made of a dielectric material;

fabricating a set of X electrodes arranged under the touch panel and having a zeroth order branch extending in an x direction; and fabricating a set of Y electrodes arranged under the touch panel and having a zeroth order branch extending in a y direction different from the x direction, such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3, wherein the ratio of the area covered by each of the X electrodes to the area covered by each of the Y electrodes is matched to lie within 20% of the aspect ratio of the touch sensitive area, so that the self capacitance of each of the X electrodes and the self capacitance of each of the Y electrodes are at least approximately the same.

The X and Y electrodes may be fabricated on a common substrate with the X and Y electrodes being arranged on the same side, or opposite sides of the common substrate. Alternatively, the X and Y electrodes may be fabricated on respective substrates one of which may be the touch panel.

According to another aspect of the disclosure, there is provided a computer automated method for designing an electrode pattern for a capacitive touch sensor, the method comprising:

selecting an electrode pattern template relating to an electrode pattern comprising:

(a) a set of X electrodes having a zeroth order branch extending in an x direction and a plurality of higher order branches; and (b) a set of Y electrodes having a zeroth order branch extending in a y direction different from the x direction, such that the zeroth order branches of the X and Y electrodes cross each other at crossing points to form a two-dimensional array of nodes which defines a touch sensitive area, the set of Y electrodes further comprising a plurality of higher order branches, wherein at least some of the higher order X and Y branches extend alongside one another separated by a gap;

generating a specification for the desired electrode pattern which specifies:

(a) lateral dimensions in x and y directions for the touch sensitive area;

(b) a number of nodes in each of the x and y directions for the touch sensitive area which correspond to the number of Y and X electrodes respectively; and (c) at least one area parameter for the X and Y electrodes; and generating an electrode pattern by varying dimensional parameters within the electrode pattern template affecting at least one of the zeroth order and higher order branches of at least one of the X and Y electrodes in order that the generated electrode pattern meets the specification.

The specification may define as an area parameter a desired ratio of the areas of the X and Y electrodes, for example unity and/or a desired absolute area, or range of areas, for at least one of the X and Y electrodes.

The aspect ratio of the touch sensitive area is equal to or greater than at least one of: 4:3, 3:2, 8:5, 16:9 and 8:3, for example.

The computer automated method for designing an electrode pattern may be followed by manufacturing a device incorporating a capacitive touch sensor having the electrode pattern generated by the design method.

A device may be provided incorporating a capacitive touch sensor manufactured according to the electrode pattern designed by the design method.

According to another aspect of the disclosure, there is provided a device incorporating a capacitive touch sensor connected to a touch-sensor controller, wherein the capacitive touch sensor comprises:

a touch panel having on an upper side a touch surface and on a lower side an internal surface, the touch panel being made of a dielectric material;

a set of X electrodes arranged under the touch panel and having a zeroth order branch extending in an x direction;

a set of Y electrodes arranged under the touch panel and having a zeroth order branch extending in a y direction different from the x direction, such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3, wherein the touch-sensor controller comprises:

a plurality of X sensor inputs connected to the X electrodes and a plurality of Y sensor inputs connected to the Y electrodes, the X sensor inputs being operable up to a maximum X self capacitance, and the Y sensor inputs being operable up to a maximum Y self capacitance, wherein the area covered by each of the X electrodes and the area covered by each of the Y electrodes are associated with respective X and Y self capacitances which are at or below said maximum X and Y self capacitances of the X and Y sensor inputs.

By co-extending, interdigitating or interleaving multiple higher order branches of the X and Y electrodes, it is possible to produce a more uniform electrical field distribution across the sub-area associated with each node (i.e. there are no dead spots such as present in the diamond pattern design). The magnitude of perturbances of touches to the electrical field become a monotonal, i.e. single valued, function of surface area of the touch, thereby simplifying the post-processing which is performed to determine touch location and size.

By co-extending, interdigitating or interleaving multiple higher order branches of the X and Y electrodes can also deliver significant benefits for the edges, since the sensitivity and linearity can be maintained right up to the edge of the touch sensitive area, i.e. in the nodes that are at the edge of the node array, allowing bezel free touch screen devices to be realized with substantially linear touch sensitivity right up to the edges.

By co-extending, interdigitating or interleaving multiple higher order branches of the X and Y electrodes, it is possible to make the electrode pattern such that the X and Y nodes are coincident with each other (not offset as in a diamond pattern for example). In particular the X and Y nodes can be arranged to form an array of square nodal areas. This enables the perturbances of a touch to X and Y electric fields to be considered independently in each of the X and Y axes (i.e. avoiding the coupling of X and Y axis perturbances that occurs in a diamond pattern for example). This further simplifies the post-processing performed by position finding algorithms, thereby improving linearity, accuracy and speed of touch determination. Moreover, for self capacitance measurements, when the touch size is smaller than the node area, there is always positional information in both X and Y axes (unlike a diamond pattern which has blind spots where touch location information in one axis is missing for small area touches on axis). Still further, making the X and Y nodes coincident with each other means that the signals associated with mutual capacitance and self capacitance measurements are centered at the same location (unlike a diamond pattern where self capacitance signal is centered in the middle of the diamonds and mutual capacitance signal is concentrated at the gaps between X and Y diamonds).

Having a high level of co-extension, interdigitation or interleaving also means that in each node area the electrode pattern has many gaps, i.e. the gaps between the co-extending, interdigitating or interleaving higher order electrode branches. This in turn leads to good coupling to ground for floating touches. For a floating touch, the principal ground of a touch screen will be the conductive material associated with the display drive electrodes. Having many gaps in the touch sensor electrode pattern means that if there is a floating touch (e.g. from a user who is not holding the device, so is not grounded to the device chassis or housing), the touch can still ground to the display electrodes. (In contrast, with a diamond pattern, a small size, poorly grounded touch near the middle of one of the diamond pads, will be screened by the diamond pad and so not find a good route to ground.)

The number and size of co-extending higher order X and Y branches, and in particular the number of co-extending, interdigitating or interleaving electrode branches between X and Y, can selected freely as a design parameter to optimise the specification in terms of lateral field uniformity, sensitivity and capacitive loading, taking account of the particular stack configuration. Parameters to take account of when designing the optimum interdigitation include: touch panel thickness, and for touch screened, distance between electrode pattern layers and relevant display layers. The level and type of interdigitation becomes a compromise between uniformity of field across the touch sensor, touch sensitivity, effective electrode impedance (charge time) and capacitive loading. In respect of charge time of an electrode, this will effectively scale with electrode area. For example, this means that if the X and Y electrodes are to have the same charge time (which is desirable) the X and Y electrode areas should be the same. Moreover, to give the sensor faster cycle times for self capacitance measurements (which is sometimes desirable), the electrode areas should smaller Co-extending, interdigitating or interleaving of X and Y higher order branches also allows electrode patterns which provide shielding of the Y electrodes (e.g. sense electrodes in mutual capacitance) by the X electrodes (e.g. drive electrodes in mutual capacitance), thereby to improve noise performance.

In the following we describe in more detail various designs of capacitive touch sensor device comprising set of crossing X and Y electrodes whose crossing points form a two-dimensional array of nodes which define a touch sensitive area. In these designs, by varying the dimensions of the electrode branches, such as width and length, and the gaps between them, the overall area of the X and Y electrodes can be varied relatively independently of each other. It is therefore possible to produce an electrode pattern in which the self capacitances of the X and Y electrodes have a certain ratio, e.g. unity, and thereby compensate for the aspect ratio of the touch sensitive area, and/or to have a certain absolute value, e.g. in order not to overload a touch-sensor controller to which the sensor is to be connected.

BRIEF DESCRIPTION OF THE DRAWINGS

In the following, the present invention will further be described by way of example only with reference to exemplary embodiments illustrated in the figures.

FIG. 3 is a schematic drawing in plan view of an example touch sensor according to embodiments of the disclosure.

FIG. 7 is a table showing ten different example patterns for a 5.6 inch (14.2 cm) sensor area that conforms to the pattern described above with reference to FIG. 6B.

FIG. 9 is a table showing ten different example patterns for a 7.3 inch (18.5 cm) sensor area that conforms to the pattern described above with reference to FIG. 6B.

FIG. 10 shows the ten example patterns #1 to #10 of FIG. 9.

FIGS. 12A and 12B are schematic drawings in plan view of a different embodiment.

FIGS. 13A and 13B are schematic drawings in plan view of another embodiment.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
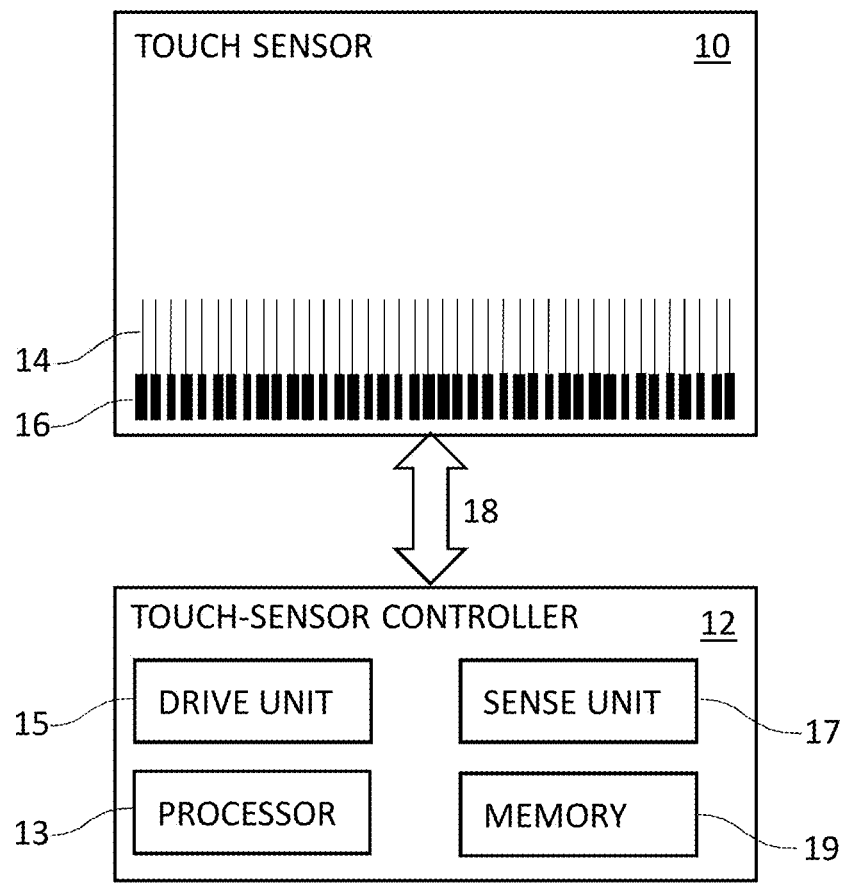
FIG. 1 illustrates an example touch sensor with an example controller.

FIG. 1 illustrates an example touch sensor 10 with an example touch-sensor controller 12, often referred to in the art as a touch integrated circuit (touch IC) or touch sensor/screen controller/chip (TSC). The touch sensor 10 and the touch-sensor controller 12 may detect the presence and location of a touch or the proximity of an object within a touch-sensitive area of the touch sensor 10. The touch sensor 10 may include one or more touch-sensitive areas. The touch sensor 10 may include an array of electrodes which may be arranged in a single layer or multiple layers. The electrode array will usually be of a conductive material, each layer of which is deposited on a dielectric material that forms a substrate, e.g. for support and/or to provide a suitable deposition surface.

Each electrode may be an area of conductive material of a desired topographic form. As an example and not by way of limitation, an electrode may be made of indium tin oxide (ITO), which is chosen for display applications, since it is transparent in the visible region. The proportion of the electrode area covered by conductive material may vary depending on the design, this percentage being sometimes referred to in the art as the fill percentage. As an example and not by way of limitation, an electrode may be made of metal or metallic material or other conductive material such as for example copper, silver, or a copper- or silver-based material or silicide. The necessary fine structure to produce a desired topography in metal is sometimes referred to as fine line metal (FLM). The conductive material may be fine-meshed in addition to its topographic form where the holes in the mesh are sized and arranged to coincide in a direction perpendicular to the plane of the touch sensor with underlying light emitters of a display, such as an OLED display. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns which fulfill a specification.

In embodiments of the disclosure, the touch sensor is fabricated as a laminar structure comprising a number of layers which are deposited or otherwise fabricated in a particular sequence. The layered structure is referred to in the art as a stack. In touch screen embodiments, the stack may further include display layers to provide an integrated display and touch sensor, i.e. an integrated touch screen. Alternatively, a touch screen may be fabricated from a sensor stack and a display stack, wherein the two stacks are unified in some suitable way as independent sub-assemblies, e.g. by a suitable bonding. The stack may comprise a substrate (or multiple substrates) and the conductive material forming the electrodes of the touch sensor 10.

The layers of a display stack enable a display screen to produce a colour or monochromatic image. The number, type and juxtaposition of layers depends on the type of display screen. For example, an LCD will have different layers and layer sequences than an OLED display. To form a touch screen, a touch sensor is typically placed over the display stack, either integrated as one stack or as two separate stacks which are arranged together after their respective manufacture.

As an example and not by way of limitation, the stack may include a first layer of optically clear adhesive (OCA) beneath a touch panel of a display stack. The touch panel may be clear and made of a resilient material suitable for repeated touching, such as for example a glass material, or a plastics material. Suitable glasses are from the alkali aluminosilicate family. Suitable plastics materials include polycarbonate (PC) and polymethyl methacrylate (PMMA). This disclosure contemplates any suitable touch panel made of any suitable material. The first layer of OCA may be disposed between a layer or substrate of the display stack and the substrate with the conductive material forming the electrodes. The substrate with the conductive material may provide a benefit or feature in producing an image (e.g., it may be a layer or substrate found in a typical, non-touch, display stack) or it may be a layer added specifically to provide a substrate on which the electrodes are formed. In some embodiments, the stack may also include a second layer of OCA. In some embodiments, the stack may also include a dielectric layer (which may be made of polyethylene terephthalate (PET) or another suitable material, similar to the substrate with the conductive material forming the electrodes). As an alternative, where appropriate, a thin coating of a dielectric material may be applied instead of the second layer of OCA and/or the dielectric layer. The second layer of OCA may be disposed between the substrate with the conductive material making up the electrodes and the dielectric layer, and the dielectric layer may be disposed between the second layer of OCA and another layer of the display stack. As an example only and not by way of limitation, the touch panel may have a thickness of approximately 0.15 to 1 mm; the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes particular example stacks with particular layers and orders of layers made of particular materials and having particular thicknesses, this disclosure contemplates any suitable stack with any suitable number of any suitable layers made of any suitable materials and having any suitable thicknesses.

In particular embodiments, the electrodes of the touch sensor 10 may be made of ITO in whole or in part. In particular embodiments, the electrodes of the touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

In a self capacitance implementation or mode of use, the touch sensor 10 has an array of electrodes of a single type that each singly forms a capacitive node. When an object touches or comes within proximity of the capacitive node, a change in self capacitance may occur at the capacitive node and the touch-sensor controller 12 may measure the change in capacitance, for example, as a change in the amount of charge needed to raise the voltage at the capacitive node by a pre-determined amount. As with a mutual capacitance implementation, by measuring changes in capacitance throughout the array, the touch-sensor controller 12 may determine the position of the touch or proximity within the touch-sensitive area(s) of the touch sensor 10.

In a mutual capacitance implementation or mode of use, the touch sensor 10 has an array of electrodes of at least two different types for drive and sense respectively, which cross each other (in plan view) to form an array of capacitive nodes. A given pair of drive and sense electrodes forming a capacitive node cross each other without making electrical contact, but with capacitive coupling across a solid dielectric situated between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of the touch sensor 10. In particular embodiments, one or more drive electrodes may together form a drive line running horizontally or vertically or in any suitable orientation Similarly, one or more sense electrodes may together form a sense line running horizontally or vertically or in any suitable orientation. In particular embodiments, drive lines may run substantially perpendicular to sense lines, although other angles of crossing are possible. Herein, reference to a drive line may encompass one or more drive electrodes making up the drive line Similarly, reference to a sense line may encompass one or more sense electrodes making up the sense line.

It will be further understood that a particular touch sensor 10 may be operable in both self capacitance and mutual capacitance modes using the same electrodes, wherein the touch-sensor controller 12 is configured to switch between these modes as desired.

To enable mutual capacitance measurements to be made, the touch sensor 10 has two types of electrodes (e.g. X and Y) formed in a grid pattern on either side of a dielectric or on one side of a dielectric. A pair of electrodes, one from each type, capacitively coupled to each other across a space between them may form a capacitive node. For a self capacitance implementation, both types of electrode are generally used (although in principle a self capacitance measurement could be made with only a single type). For example, to carry out a self capacitance measurement, all the X and Y electrodes can be driven to a certain potential and then discharged through an analog integrator. Each pin has a tristate output architecture and an analog integrator (or a connection to allow each pin to be multiplexed to an analog integrator), with the states being: drive, float, switch to integrator, measure and discharge. The same touch sensor is therefore able to operate in both mutual capacitance and self capacitance modes.

Where the electrodes of the two different types cross (as viewed in plan view) and hence come nearest to each other a capacitive node is formed. Where they cross, the electrodes do not make electrical contact with each other, but are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of the touch sensor 10 may indicate a touch or proximity input at the position of the capacitive node. The touch-sensor controller 12 may detect and process the change in capacitance to determine the presence and location of the touch or proximity input. The touch-sensor controller 12 may then communicate information about the touch or proximity input to one or more other components (such one or more central processing units (CPUs)) of a device that includes the touch sensor 10 and the touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

In particular embodiments, the touch-sensor controller 12 comprises analogue circuitry, digital logic, and digital volatile or non-volatile memory. The touch-sensor controller 12 may include one or more integrated circuits (ICs), such as for example general-purpose microprocessors, microcontrollers, programmable logic devices or programmable logic arrays (PLAs), or application-specific ICs (ASICs). The memory of the touch-sensor controller 12 may be a random access memory (RAM), a read-only memory (ROM), an erasable programmable read-only memory (EPROM or Flash memory), a static random access memory (SRAM), and any suitable combination of the foregoing. The touch-sensor controller 12 may be programmed with computer readable program instructions which can be downloaded from a computer readable storage medium or an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The touch-sensor controller 12 comprises electronic circuitry and may be programmed, for example, with programmable logic circuitry, field-programmable gate arrays (FPGA), or programmable logic arrays (PLA) which may execute the computer readable program instructions by utilizing state information of the computer readable program instructions to personalize the electronic circuitry, in order to perform aspects of the present disclosure.

In particular embodiments, the touch-sensor controller 12 is disposed on a flexible printed circuit (FPC) bonded to the substrate of the touch sensor 10. The FPC may be active or passive, where appropriate. In particular embodiments, multiple touch-sensor controllers 12 are disposed on the FPC. The touch-sensor controller 12 may include a processor 13, a drive unit 15, a sense unit 17, and a memory 19. The drive unit 15 may supply drive signals to the drive electrodes of the touch sensor 10 for making mutual capacitance measurements. The sense unit 17 may sense charge at the capacitive nodes of the touch sensor 10, in both mutual and self capacitance measurements, and provide measurement signals to the processor 13 representing capacitances at the capacitive nodes. The processor 13 may control the supply of drive signals to the drive electrodes by the drive unit 15 and process measurement signals from the sense unit 17 to detect and process the presence and location of a touch or proximity input within the touch-sensitive area(s) of the touch sensor 10. The processor 13 may also follow changes in the position of a touch or proximity input within the touch-sensitive area(s) of the touch sensor 10. The memory 19 may store programming for execution by the processor 13, including programming for controlling the drive unit 15 to supply drive signals to the drive electrodes, programming for processing measurement signals from the sense unit 17, and other suitable programming, where appropriate. Although this disclosure describes a particular touch-sensor controller having a particular implementation with particular components, this disclosure contemplates any suitable touch-sensor controller having any suitable implementation with any suitable components.

On a substrate of the touch sensor 10, a plurality of tracks 14 of conductive material are disposed to couple each of the X and Y electrodes of the touch sensor 10 to connection pads 16, which are disposed on a substrate of the touch sensor 10. The connection pads 16 facilitate coupling of the tracks 14 (and hence X and Y electrode lines) to the touch-sensor controller 12. The tracks 14 may extend into or around (e.g. at the edges of) the touch-sensitive area(s) of the touch sensor 10. A particular subset of the tracks 14 may provide drive connections for coupling touch-sensor controller 12 to drive electrodes of the touch sensor 10, through which the drive unit 15 of touch-sensor controller 12 may supply drive signals to the drive electrodes. Other tracks 14 may provide sense connections for coupling touch-sensor controller 12 to sense electrodes of the touch sensor 10, through which the sense unit 17 of touch-sensor controller 12 may sense charge at the capacitive nodes of the touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of the touch sensor 10 (similar to tracks 14).

The connection pads 16 may be located along one or more edges of the touch sensor 10, outside the touch-sensitive area(s). As described above, the touch-sensor controller 12 may be on an FPC. The connection pads 16 may be made of the same material as the tracks 14 and may be bonded to the FPC using an anisotropic conductive film (ACF). The connection 18 may include conductive lines on the FPC coupling the touch-sensor controller 12 to the connection pads 16, in turn coupling the touch-sensor controller 12 to the tracks 14 and to the electrodes of the touch sensor 10. This disclosure contemplates any suitable form or type of connection 18 between the touch-sensor controller 12 and the touch sensor 10.

Figure 2A:
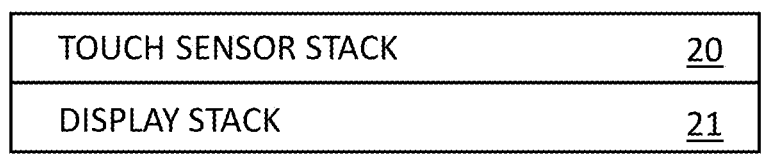
FIG. 2A illustrates a block diagram of an on-stack touch screen where the layers associated with the sensor function are physically separate from and functionally independent of the layers associated with the display function.

FIG. 2A illustrates a block diagram of an on-stack touch screen in accordance with particular embodiments comprising a touch sensor stack 20 arranged on a display stack 21. In an on-stack design, the layers associated with the sensor function are physically separate from and largely electrically functionally independent of the layers associated with the display function (although there will inevitably be some capacitive coupling of the touch sensor to conductive parts of the display stack, principally the TFT drive electrodes).

Figure 2B:
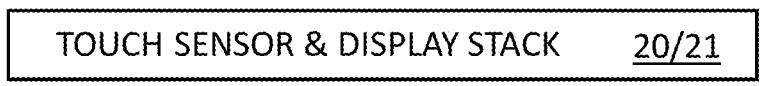
FIG. 2B illustrates a block diagram of an in-cell touch screen where the layers associated with the sensor function and display function are interleaved and/or shared.

FIG. 2B illustrates a block diagram of an in-cell touch screen in accordance with particular embodiments comprising a combined touch sensor and display stack 20, 21. In an in-cell design, the layers associated with the sensor function and display function are interleaved and/or shared.

The display stack 21 may comprise a plurality of layers configured to generate a colour image. The type and number of layers within the display stack 21 may vary depending on the type of display stack and/or the intended application of the display stack 21. For example, an LCD display stack 21 will typically require at least two polarisers above and below the liquid crystal layer, whereas an OLED display stack 21 does not require a polariser, but may include one or two. Each layer may comprise a particular feature or characteristic used in a display stack 21 for generating an image. These layers may in some embodiments, be configured to provide a colour image. Particular embodiments contemplate the display stack 21 comprising any number and/or type of layers for any type of display. In some embodiments, the display stack 21 may be a flexible display stack. In some embodiments, the display stack 21 may be curved over one or more parts of its surface (e.g. Samsung Galaxy Edge (trade mark) mobile telephone) or over its whole surface (e.g. large screen television). In still further embodiments, the display stack 21 may be flexible so that it can be flat or adopt a variety of complex curves depending on its environment. It is noted that for non-flat stacks, references to x and y or X and Y should be interpreted to lie in the plane of the stack layers, even if the plane is curved or otherwise non-planar in real space.

One or more components of the touch sensor 10 may be integrated into the display stack 21 in any of a variety of different ways, depending on operational needs or the particular embodiment. The touch sensor 10 may be located in any of a variety of different locations within the display stack 21. The location of the touch sensor 10 may vary depending on the type of the display stack 21 (e.g., an LCD display, OLED display, e-ink display etc.). For example, in an LCD display in which display stack 21 includes at least two polarisers, the touch sensor 10 may be positioned within the display stack 21 so as to not alter the polarisation of the light. For example, in an LCD display stack 21, if the touch sensor 10 includes a substrate made of a birefringent material, then the touch sensor 10 is not arranged between the LCD's two polarisers, but rather above them. If the touch sensor 10 includes a substrate made of a non-birefringent material, the touch sensor 10 may be positioned between the polarisers of the display stack 21. On the other hand, in an OLED display stack 21, it may not matter whether or not the touch sensor 10 includes a layer of birefringent material, so there is more design freedom to arrange the touch sensor layers where desired, e.g. some of the touch sensor layers interleaved with (or combined with) layers of the display stack 21. For example, in some embodiments the touch sensor 10 may use an existing layer (e.g., a layer found in a typical non-touch display stack, such as the colour filter layer or one of the polariser layers, etc.) of the display stack 21 as a substrate.

The touch sensor 10 may be similar to, and comprise similar components and functionality as, the touch sensor 10 described above with respect to FIG. 1. Depending on the embodiment, and/or operational needs, the touch sensor 10 may be a laminated layer within the display stack 21, or one or more of the components of the touch sensor 10 (e.g., fine line metal electrodes for sensing a touch input) may be deposited on an existing layer of the display stack 21. This may allow the touch sensing functionality to be included during the manufacturing of the display stack 21. In embodiments in which the touch sensor 10 is deposited on an existing layer of the display stack 21, the existing layer of the display stack 21 may function as the substrate for the touch sensor 10. In other embodiments, the touch sensor 10 may comprise its own substrate that is placed within the display stack 21. Depending on the type of display and/or the desired location of the touch sensor 10 within display stack, the substrate used for the touch sensor 10 may be made of a birefringent material or a non-birefringent material. In certain embodiments, having the touch sensor 10 within the display stack 21 allows for a display stack with touch sensing capability that is substantially free of any air gaps between the touch sensor 10 and display stack 21. As such, in certain embodiments, having the touch sensor 10 within the display stack 21 allows for a display stack with touch sensing capability that is thinner than a traditional display stack with a touch sensor added on top of the display stack.

FIG. 3 is a schematic plan view of an example touch sensor 10 according to embodiments of the disclosure which is of the grid type. There are two groups of parallel electrodes, X electrodes 24 and Y electrodes 26. The X and Y electrodes are illustrated as extending orthogonal to each other, but other angles could be used, so long as the X and Y electrodes cross to form a suitable number and overall density of nodes 25, where nodes are defined by the crossing points of pairs of X and Y electrodes (as viewed in plan view). An example node (X3, Y3) is marked in the figure. The number of nodes 25 will generally be the product of the number of X electrodes and Y electrodes—in the illustrated example there are M×N nodes, where M is the number of X electrode lines and N is the number of Y electrode lines. Each node, i.e. crossing point, 25 is associated with a sub-area 27 of the touch sensor into which X and Y electrode patterning can extend so that touches will generate signals that will be associated with that node. (No electrode patterning is shown in FIG. 3; only the so-called spines of the X and Y electrodes.) For example, in the figure, node (X3, Y6) has a possible associated sub-area 27 marked with bold hatching. Assuming that there are no crossings between X and Y electrodes except at the principal crossing-points 25 (which is the usual case), then the extent of the sub-area for an arbitrary crossing point between electrodes $X_n$ and $Y_n$ is defined by the area formed between electrodes $X_{n-1}$ and $X_{n+1}$ and $Y_{n-1}$ and $Y_{n+1}$, i.e. a block of four squares in FIG. 3. In some electrode patterns, touches anywhere within the sub-area will generate signals that will be associated with that node. However, with other electrode patterns, only a portion of the sub-area will be associated with the node. The X and Y electrodes are arranged either side of a dielectric layer (not visible in the figure), so they are vertically offset from each other by the thickness of the dielectric layer, vertical meaning orthogonal to the plane of the stack layers, i.e. in the figure perpendicular to the plane of the paper. If desired, it is possible to deposit the X and Y electrodes on the same side of a dielectric, substrate layer with thin films of insulating, dielectric material being locally deposited at the cross-overs to avoid shorting between the X and Y electrodes. A single electrode layer design of this kind is disclosed in US 2010/156810 A1, the entire contents of which are incorporated herein by reference. In the figure, a schematic touch T by a finger from a user's hand H is shown. From the illustration, it is clear that a single touch can often extend over several nodes—in the illustration the touch covers four nodes extending over two adjacent X lines and two adjacent Y lines. Having signals from at least two adjacent X electrodes and at least two adjacent Y electrodes respectively enables interpolation of the touch signals to be performed in both x and y directions in order to deduce the x, y touch coordinates. It will be understood that a crossing point is not actually a point in a geometric sense, but rather an area, since at the crossing point where an X and Y electrode cross there will be a finite area, as considered in plan view, over which the X electrode and the Y electrode overlap. In the case of orthogonal crossing of straight X and Y electrode portions of respective widths Wxc and Wyc, the overlap area will be the product of Wxc and Wyc.

Figure 4:
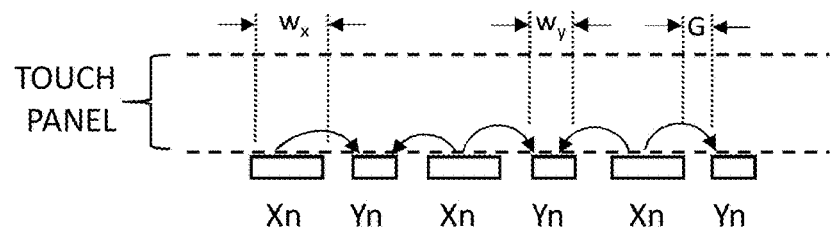
FIG. 4 is a schematic cross-section through a touch panel showing the electric field distribution during a mutual capacitance measurement for a highly interdigitated electrode pattern according to several embodiments of the disclosure.

FIG. 4 is a schematic cross-section through a touch panel showing the electric field distribution during a mutual capacitance measurement for a highly interdigitated electrode pattern according to several embodiments of the disclosure. The schematic cross-section is in a plane perpendicular to the plane of the stack showing a mutual capacitance measurement involving multiple interdigitated electrode branches of X (drive) and Y (sense) electrodes: Xn, Yn. Electric field lines are shown schematically with the arrow-headed, curved lines. As can be appreciated from the schematic depiction, field strength is highest in the region adjacent the gap 'G' between the X and Y electrodes and decreases towards the interior of each electrode, the gap 'G' being dimensioned to be suitable for making a mutual capacitance measurement of a touching object impinging on the touch surface. The high degree of interdigitation or interleaving between the X and Y electrode branches, which are relatively narrow, with widths '$w_x$' and '$w_y$' respectively in cross-section in the plane of the electrode pattern and transverse to the direction of extent of the relevant electrode branch, has the consequence that a highly uniform electrical field distribution in the plane of the touch surface is provided within each node area, and hence across all nodes, i.e. the whole sensor area.

Having different cross-sectional widths '$w_x$' and '$w_y$' for the interdigitating X and Y electrodes is one way in which the overall area covered by the X electrodes can be matched to the area covered by the Y electrodes over the whole touch sensitive area, thereby compensating for the fact that the touch sensitive area is non-square, i.e. rectangular, or substantially rectangular e.g. with rounded corners, in a typical case. Other ways are discussed further below, such as having different lengths of electrode branches in X and Y.

In the following, the cross-sectional dimension of an electrode branch in the plane of the electrode pattern transverse to the direction of extent of the electrode branch is often referred to as width, where it will be understood this is the dimension in the xy-plane of the electrode branch, i.e. in a plane orthogonal to the z-direction which is the direction of building the layer stack.

The magnitude of perturbances of touches to the electrical field become a monotonal, i.e. single valued, function of surface area of the touch, thereby simplifying the post-processing which is performed to determine touch location and size. The field uniformity and good sensitivity within each node area, also means that there is no significant deterioration of performance for nodes that are at the edge (or corner) of the node array, either their sensitivity or their lateral field uniformity. Since electric field strength decreases with vertical distance away from the electrode plane(s), the width of the in-plane cross-section of the interdigitating electrodes, which typically corresponds to the number of interleaving electrode branches, can be chosen in any particular design to ensure the desired lateral field uniformity at the touch surface. This means that thinner touch panels can be accommodated by designing the electrode pattern to have a larger number of and/or narrower interdigitating branches while still maintaining lateral field uniformity.

Figure 5:
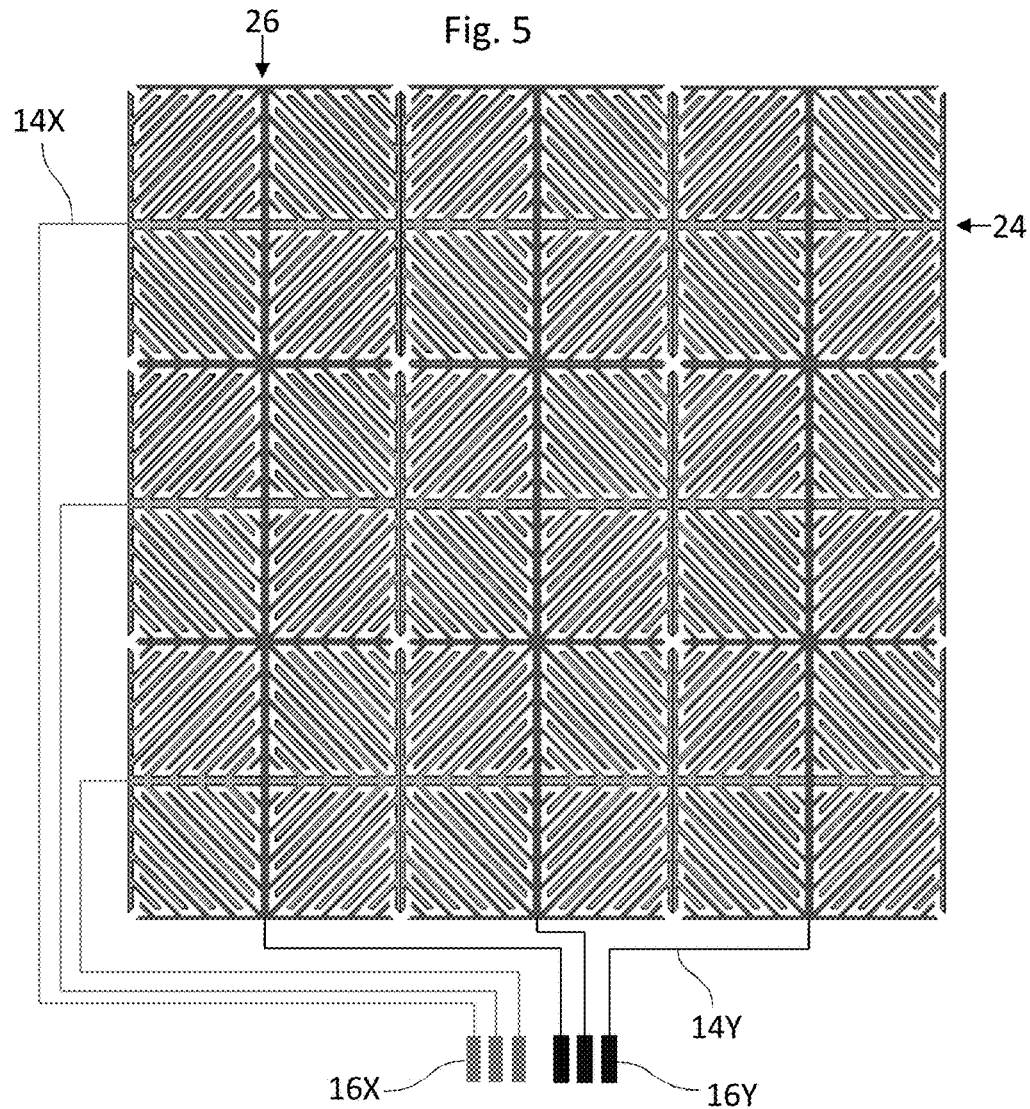
FIG. 5 is a schematic drawing in plan view of an embodiment electrode pattern on which many of the subsequent examples are based.

FIG. 5 is a schematic drawing of a particular electrode pattern on which many of the subsequent examples are based. FIG. 5 shows an electrode pattern comprising a nominal 3×3 array of nodes with associated tracks and connection pads.

Figure 6A:
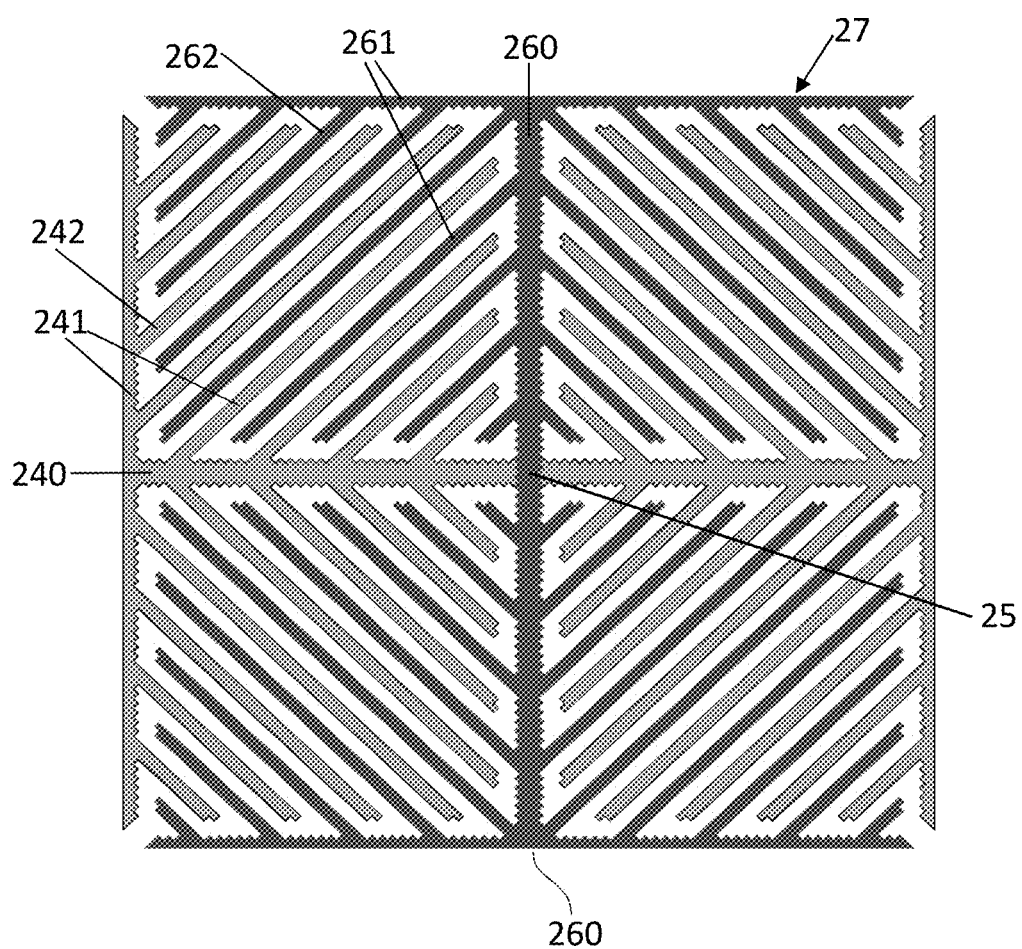
FIG. 6A shows in more detail of one of the node areas of FIG. 5.
Figure 6B:
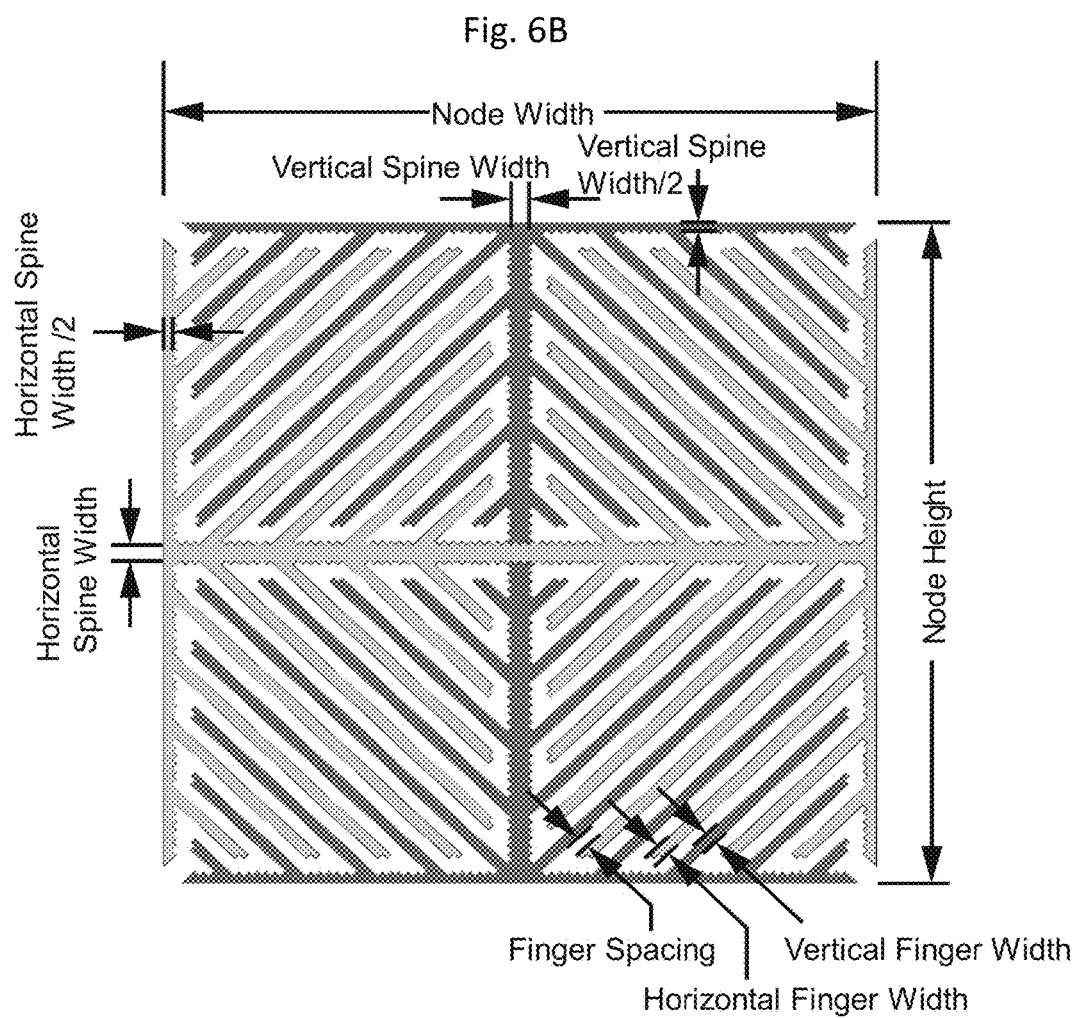
FIG. 6B shows the same node area as FIG. 6A with labelling of geometric parameters which are variables in the pattern design.

FIGS. 6A and 6B shows a zoomed in portion of FIG. 5 in the immediate vicinity of one of the nodes. FIG. 6A labels the features with reference numerals. FIG. 6B labels certain geometric parameters which can be used as variables in the pattern design. It will be appreciated that a commercial device will normally have a larger node array, but a 3×3 array is sufficient to show all aspects of the pattern, in particular at the x and y edges and corners as well as in the interior away from the edges.

For mutual capacitance measurements, we take the X electrodes as being connected to be operable as drive electrodes and the Y electrodes as being connected to be operable as sense electrodes. (However, the opposite arrangement is also possible, i.e. X is sense and Y is drive.) The X electrodes may be arranged below the Y electrodes, so that the Y electrodes are closer to the touch panel than the X electrodes. (However, the opposite ordering is also possible.)

The electrode pattern forms one or more layers of a capacitive touch sensor as described elsewhere in this document. The electrode pattern underlies a touch panel having on an upper side a touch surface and on a lower side an internal surface. The touch panel is made of a dielectric material. The electrode pattern may be embedded in a dielectric material, such as a suitable adhesive and/or be disposed on one side of a non-conductive substrate.

Elements of the basic structure are as described above in relation to FIG. 1 and FIG. 3. Referring to FIG. 5, three rows of X electrodes 24 are connected to respective X-electrode tracks 14X which lead to connection pads 16X to ohmically couple each row of X electrodes to a touch-sensor controller. Similarly, three columns of Y electrodes 26 are connected to respective Y-electrode tracks 14Y which lead to connection pads 16Y to ohmically couple each column of Y electrodes to a touch-sensor controller. The X electrodes are shown with lighter grey shading and the Y electrodes darker in the figure.

Each electrode has a branch structure with a central spine or trunk which is the part of the electrode that forms the nodes, and branches off the spine, which in turn may have branches from them also. We therefore refer to a spine as a zeroth order branch, a branch from the spine as a first order branch, a branch from the first order branch as a second order branch and so forth. The second, third, fourth etc. order branches are collectively referred to as higher order branches in contradistinction from the zeroth order branches.

The electrode pattern therefore comprises a set of X electrodes 24 each having a zeroth order branch (i.e. X-spine) extending in an x-direction and a set of Y electrodes 26 each having a zeroth order branch (i.e. Y-spine) extending in a y-direction transverse to the x-direction. Typically, the x- and y-directions will be at right angles to each other, although this is not technically necessary. The zeroth order branches of the X and Y electrodes cross each other at crossing points 25 to form a two-dimensional array of nodes. The zeroth order branches of any two adjacent X electrodes and any two adjacent Y electrodes enclose a sub-area, which is square or rectangular in the case of x being orthogonal to y. It will be appreciated that in commercial devices, the sub-areas are most commonly square to provide the same touch resolution in the x and y directions.

The X and Y electrodes 24 and 26 each further comprise higher order branches of order n, each of which is confined to the sub-area into which it buds or branches. The value 'n' is a positive integer (i.e. 1, 2, 3 . . . ). An nth order branch buds from an (n−1)th order branch. Away from edges of the node array, each node is thus associated with four sub-areas.

Each X electrode 24 has first order branches 241, branching from its zeroth order branch 240, and second order branches 242 branching from its first order branches 241. The zeroth order branch 240 extends in the x direction. The first order branches 241 extend in the y direction. The second order branches 242 extend in the x direction. Each Y electrode 26 has first order branches 261, branching from its zeroth order branch 260. The zeroth order branch 260 extends in the y direction. The first order branches 261 extend in the x direction.

The zeroth order X and Y branches 240, 260 maintain constant width, i.e. are not narrowed at the crossing points 25. In the plan view illustration, the Y branch 260 is shown passing over the X branch 240 in the manner of a bridge and river respectively. (Alternatively, the zeroth order X branch could pass over the zeroth order Y branch.)

The zeroth order branches 240 of the X electrodes 24 have a width that is greater than the width of at least the co-extending ones of the higher order X electrode branches. In certain embodiments, the zeroth order X branches 240 are wider by a factor of at least one of 1.5, 2, 2.5, 3, 4, 5, 6, 7, 8, 9 and 10. In certain embodiments, the factor for the X branches is no more than at least one of 20, 18, 16, 14, 12, 10, 9, 8, 7, 6 and 5.

The zeroth order branches 260 of the Y electrodes 26 have a width that is greater than the width of at least the co-extending ones of the higher order Y electrode branches. In certain embodiments, the zeroth order Y branches 260 are wider by a factor of at least one of 1.5, 2, 2.5, 3, 4, 5, 6, 7, 8, 9 and 10. In certain embodiments, the factor for the Y branches is no more than at least one of 20, 18, 16, 14, 12, 10, 9, 8, 7, 6 and 5.

Both the X and Y electrodes may be made wider and may have substantially the same widths as each other, or different widths. The x:y aspect ratio of the touch sensitive area may be equal to or greater than at least one of: 4:3, 3:2, 16:9 and 8:3. The zeroth order X-electrode width can be selected having regard to the aspect ratio so that the zeroth order X-electrode width is greater than the zeroth order Y-electrode width by at least approximately the x:y aspect ratio In each sub-area, certain ones of the higher order X and Y branches extend alongside one another separated by a gap 'G' suitable for making a mutual capacitance measurement of a touching object impinging on the touch surface. In the illustrated pattern, the co-extending higher order X and Y branches are: first order X and Y branches 241, 261; second order X branches 242 with first order Y branches 261; and second order X and Y branches 242, 262. The co-extending branches all extend at an oblique angle to the x and y directions; in the illustrated pattern the angle is approximately 45 degrees away from x and y. The pattern may be varied to vary the oblique angle of the co-extending higher order branches. The co-extension is in the form of an interdigitation of fingers, the fingers being the above-mentioned higher order branches. The fact that the co-extending higher order branches do not extend in the x- and y-directions, but rather at an angle thereto, can have advantages in relation to improved sensitivity to swipes or other gestures when those gestures are precisely or approximately along the x- or y-directions.

The exact number of co-extending higher order branches per sub-area can be varied as desired. For example, there may be 4, 5, 6, 7, 8, 9, 10 or more higher order X and 4, 5, 6, 7, 8, 9, 10 or more higher order Y branches that extend alongside one another.

The edges of the zeroth order branches and the x- and y-extending first order branches are shown serrated. In a variant, they could be smooth.

Referring to FIG. 6B, the labelling is as follows:

| PARAMETER LABEL | FEATURE |
|---|---|
| Node Width | extent in x-direction of node |
| Node Height | extent in y-direction of node |
| Vertical Spine Width | width of zeroth order Y branch |
| Horizontal Spine Width | width of zeroth order X branch |
| Vertical Spine Width/2 | width of first order, x-extending Y branch at the node perimeter, which in the examples below is fixed at half the zeroth order Y branch width |
| Horizontal Spine Width/2 | width of first order, y-extending X branch at the node perimeter, which in the examples below is fixed at half the zeroth order X branch width |
| Finger Spacing | Gap 'G' between co-extending higher order X and Y electrode branches |
| Vertical Finger Width | Width '$w_y$' of co-extending higher order Y electrode branches, which are first and second order branches in this pattern |
| Horizontal Finger Width | Width '$w_x$' of co-extending higher order X electrode branches, which are first and second order branches in this pattern |

As will be described below, design proceeds by choosing a desired node width and node height, and then varying the other parameters listed in the above table in order to make the overall X electrode area and the overall Y electrode area equal, or as near equal as is necessary to meet a specification. It will be appreciated that other parameters relating to the geometry of the electrodes could also be varied to achieve equal X and Y electrode areas, but the above have proven sufficient to achieve the goal. For example, it is not necessary to fix the widths of the first order branches at the node perimeters to be half the zeroth order branch widths. Moreover, the relative length of the co-extending higher order X and Y branches could be varied.

FIG. 7 is a table showing ten different example patterns conforming to the pattern described above with reference to FIGS. 5, 6A and 6B, for a 5.6 inch (14.2 cm) sensor area with square nodes, i.e. same node width and node height, of 3.76 mm and an array of 32×20 nodes in X and Y, i.e. an aspect ratio of 8:5. The vertical and horizontal spine widths were kept the same, and also the half spine width limitation stated above was also applied. It can be seen that all the patterns achieve the goal of having the overall X and Y electrode areas almost exactly the same. The percentage difference between the overall X and Y electrode areas in the ten examples is between 0.005 and 0.3 percent. However, there is a wide range of electrode areas, i.e. a wide range of fill factors, where fill factor is the percentage of the whole node area occupied by the electrodes. (It is noted that in this context fill factor does not include any infill of electrode material, e.g. isolated islands, that are not part of the X or Y electrodes.) The fill factors are between 42% and 87%. Depending on the application a higher or lower fill factor may be desirable. A high fill factor will promote self capacitance measurements, whereas a lower fill factor will result in faster charging times.

Figure 8:
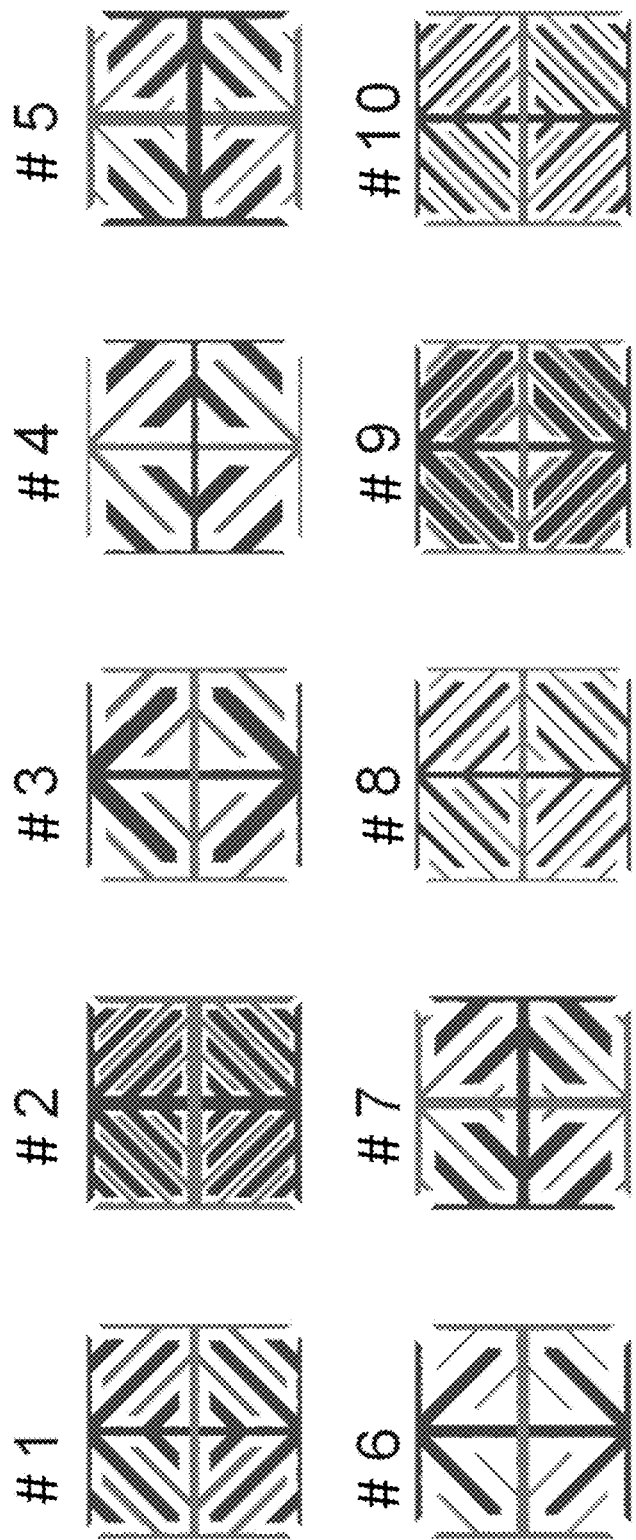
FIG. 8 shows the ten example patterns #1 to #10 of FIG. 7.

FIG. 8 shows the ten example patterns #1 to #10 of FIG. 7.

FIG. 9 is a table showing ten different example patterns conforming to the pattern described above with reference to FIGS. 5, 6A and 6B, for a 7.3 inch (18.5 cm) sensor area with square nodes, i.e. same node width and node height, of 5.45 mm and an array of 32×12 nodes in X and Y, i.e. an aspect ratio of 8:3. The vertical and horizontal spine widths were kept the same, and also the half spine width limitation stated above was also applied. It can be seen that all the patterns achieve the goal of having the overall X and Y electrode areas very close to each other. The percentage difference between the overall X and Y electrode areas in the ten examples is between 0.12 and 0.86 percent. However, there is a wide range of electrode areas, i.e. a wide range of fill factors, where fill factor is the percentage of the whole node area occupied by the electrodes. (It is noted that in this context fill factor does not include any infill of electrode material, e.g. isolated islands, that are not part of the X or Y electrodes.) The fill factors are between 29% and 65%. Depending on the application a higher or lower fill factor may be desirable. A high fill factor will promote self capacitance measurements, whereas a lower fill factor will result in faster charging times.

FIG. 10 shows the ten example patterns #1 to #10 of FIG. 9.

We now describe several alternative electrode patterns which are suitable for implementing the idea of varying the ratio of X electrode to Y electrode material (or the absolute amount of X electrode material or Y electrode material) within any given node area, to achieve a balance between the overall areas of the X and Y electrodes (or to bring the absolute area of either the X electrodes or the Y electrodes or both to within a certain desired value).

Figures 11A, 11B:
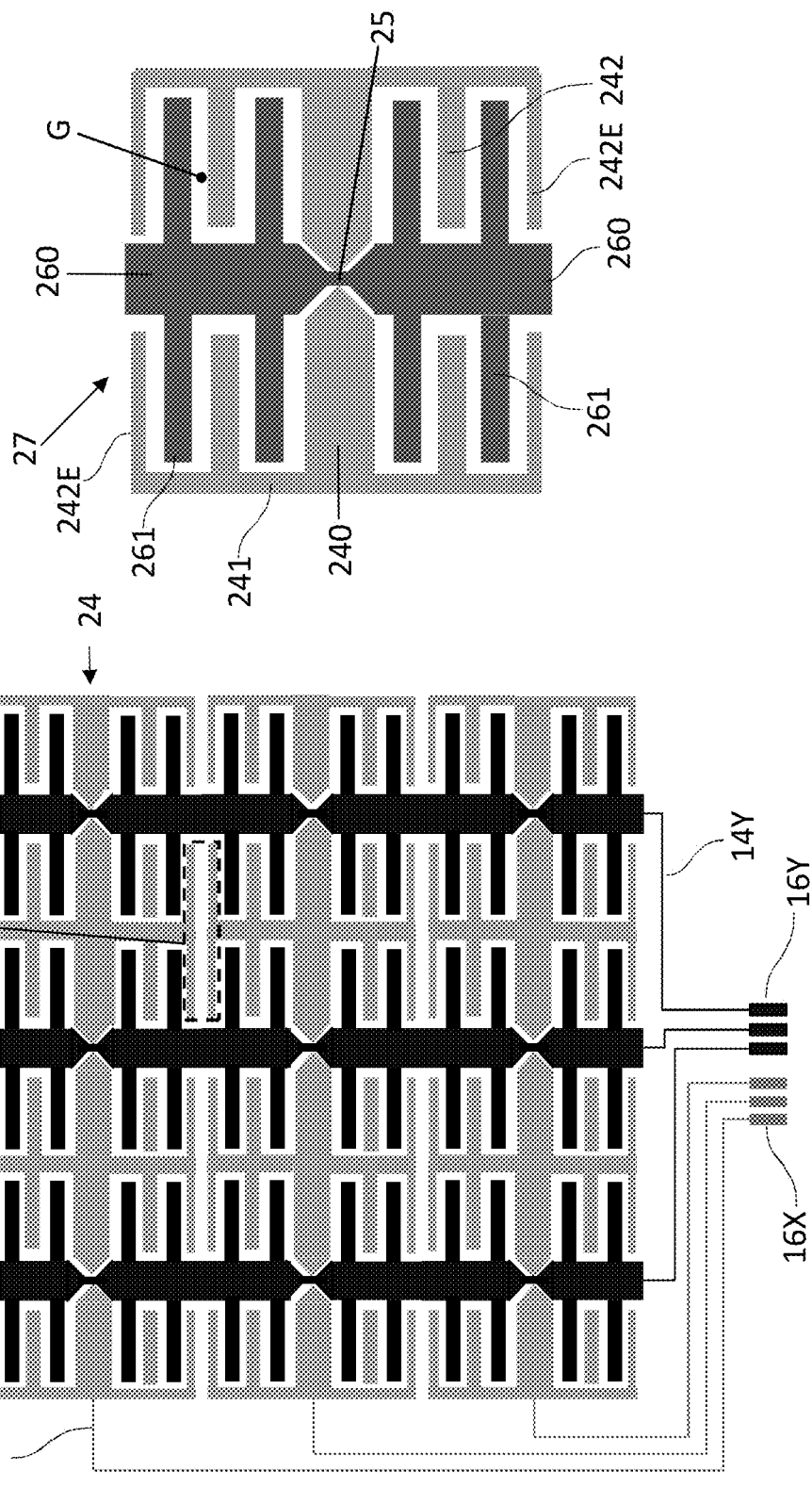
FIGS. 11A and 11B are schematic drawings in plan view of a different embodiment.

FIGS. 11A and 11B are schematic drawings of an embodiment. FIG. 11A shows an electrode pattern comprising a nominal 3×3 array of nodes with associated tracks and connection pads, whereas FIG. 11B shows a zoomed in portion of FIG. 11A in the immediate vicinity of one of the nodes. It will be appreciated that a commercial device will normally have a larger node array, but a 3×3 array is sufficient to show all aspects of the pattern, in particular at the x and y edges and corners as well as in the interior away from the edges.

For mutual capacitance measurements, we take the X electrodes as being connected to be operable as drive electrodes and the Y electrodes as being connected to be operable as sense electrodes. (However, the opposite arrangement is also possible, i.e. X is sense and Y is drive.) The X electrodes may be arranged below the Y electrodes, so that the Y electrodes are closer to the touch panel than the X electrodes. (However, the opposite ordering is also possible.)

The electrode pattern forms one or more layers of a capacitive touch sensor as described elsewhere in this document. The electrode pattern underlies a touch panel having on an upper side a touch surface and on a lower side an internal surface. The touch panel is made of a dielectric material. The electrode pattern may be embedded in a dielectric material, such as a suitable adhesive and/or be disposed on one side of a non-conductive substrate.

Elements of the basic structure are as described above in relation to FIG. 1 and FIG. 3. Referring to FIG. 11A, three rows of X electrodes 24 are connected to respective X-electrode tracks 14X which lead to connection pads 16X to ohmically couple each row of X electrodes to a touch-sensor controller Similarly, three columns of Y electrodes 26 are connected to respective Y-electrode tracks 14Y which lead to connection pads 16Y to ohmically couple each column of Y electrodes to a touch-sensor controller. The X electrodes are shown with lighter grey shading and the Y electrodes darker in the figure.

Each electrode has a branch structure with a central spine or trunk which is the part of the electrode that forms the nodes, and branches off the spine, which in turn may have branches from them also. We therefore refer to a spine as a zeroth order branch, a branch from the spine as a first order branch, a branch from the first order branch as a second order branch and so forth. The second, third, fourth etc. order branches are collectively referred to as higher order branches in contradistinction from the zeroth order branches.

The electrode pattern therefore comprises a set of X electrodes 24 each having a zeroth order branch (i.e. X-spine) extending in an x-direction and a set of Y electrodes 26 each having a zeroth order branch (i.e. Y-spine) extending in a y-direction transverse to the x-direction. Typically, the x- and y-directions will be at right angles to each other, although this is not technically necessary. The zeroth order branches of the X and Y electrodes cross each other at crossing points 25 to form a two-dimensional array of nodes. The zeroth order branches of any two adjacent X electrodes and any two adjacent Y electrodes enclose a sub-area, which is square or rectangular in the case of x being orthogonal to y. It will be appreciated that in commercial devices, the sub-areas are most commonly square to provide the same touch resolution in the x and y directions.

The X and Y electrodes 24 and 26 each further comprise higher order branches of order n, each of which is confined to the sub-area into which it buds or branches. The value 'n' is a positive integer (i.e. 1, 2, 3 . . . ). An nth order branch buds from an (n−1)th order branch. Away from edges of the node array, each node is thus associated with four sub-areas.

Each X electrode 24 has first order branches 241, branching from its zeroth order branch 240, and second order branches 242 branching from its first order branches 241. The zeroth order branch 240 extends in the x direction. The first order branches 241 extend in the y direction. The second order branches 242 extend in the x direction. Each Y electrode 26 has first order branches 261, branching from its zeroth order branch 260. The zeroth order branch 260 extends in the y direction. The first order branches 261 extend in the x direction.

The zeroth order X and Y branches 240, 260 are narrowed at the crossing points 25 to reduce the area of crossing represented by the product of the respective widths of the X and Y zeroth order branches at the crossing point 25. In the plan view illustration, the Y branch 260 is shown passing over the X branch 240 in the manner of a bridge and river respectively. (Alternatively, the zeroth order X branch could pass over the zeroth order Y branch.)

Away from the narrowed regions near the crossing points 25, the zeroth order branches 240 of the X electrodes 24 have a width that is greater than the width of at least the co-extending ones of the higher order X electrode branches. In certain embodiments, the zeroth order X branches 240 are wider by a factor of at least one of 1.5, 2, 2.5, 3, 4, 5, 6, 7, 8, 9 and 10. In certain embodiments, the factor for the X branches is no more than at least one of 20, 18, 16, 14, 12, 10, 9, 8, 7, 6 and 5.

Away from the narrowed regions near the crossing points 25, the zeroth order branches 260 of the Y electrodes 26 have a width that is greater than the width of at least the co-extending ones of the higher order Y electrode branches. In certain embodiments, the zeroth order Y branches 260 are wider by a factor of at least one of 1.5, 2, 2.5, 3, 4, 5, 6, 7, 8, 9 and 10. In certain embodiments, the factor for the Y branches is no more than at least one of 20, 18, 16, 14, 12, 10, 9, 8, 7, 6 and 5.

Both the X and Y electrodes may be made wider and may have substantially the same widths as each other, or different widths. The x:y aspect ratio of the touch sensitive area may be equal to or greater than at least one of: 4:3, 3:2, 16:9 and 8:3. The zeroth order X-electrode width can be selected having regard to the aspect ratio so that the zeroth order X-electrode width is greater than the zeroth order Y-electrode width by at least approximately the x:y aspect ratio.

Keeping the zeroth order branches, i.e. the electrode spines, thick keeps the conductivity of the whole electrode high, so that having a high degree of interdigitation in the higher order branches, i.e. narrow higher order branches, can be tolerated.

In each sub-area, certain ones of the higher order X and Y branches extend alongside one another separated by a gap 'G' suitable for making a mutual capacitance measurement of a touching object impinging on the touch surface. In the illustrated pattern, the co-extending higher order X and Y branches are first order Y branches 261 and second order X branches 242 which extend in the x direction. The co-extension is in the form of an interdigitation of fingers, the fingers being the above-mentioned higher order branches.

As can be seen from FIG. 11B, in each sub-area, the outermost second order X branches 242 (i.e. farthest from either side of the zeroth order branch in the y-direction) enclose the outermost (also in the y-direction) first order Y branches 261. These outermost second order X branches are given the reference numeral 242E. The mutual capacitances between the second order X branches and first order Y branches are thus substantially confined to, i.e. encapsulated in, the portion of the sub-area illustrated in FIG. 11B. In the y-direction, the outermost second order X branches 242E that provide the field encapsulation are directly adjacent to those of the neighbouring X electrode, i.e. there is no portion of Y electrode in between them. One of these pattern regions is marked with the dotted box labelled 'E' in FIG. 11A.

In particular, it can be seen that there is one more interdigitating X branch than Y branch (5 vs 4 in the illustration) so that all the interdigitating Y branches are enclosed by interdigitating X branches.

The exact number of co-extending higher order branches per sub-area can be varied as desired. For example, there may be 4, 5, 6, 7, 8, 9, 10 or more higher order X and 4, 5, 6, 7, 8, 9, 10 or more higher order Y branches that extend alongside one another.

Figure 11C:
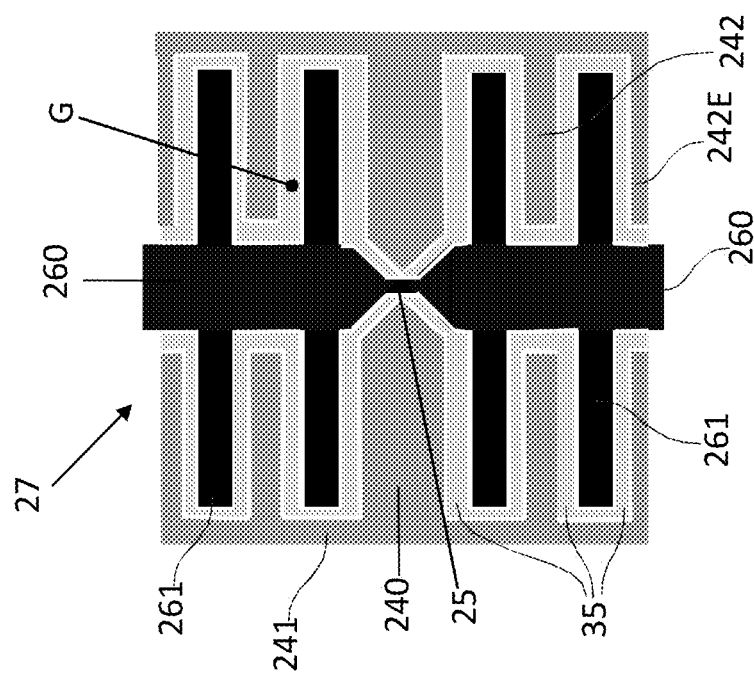
FIG. 11C is a variant of the embodiment of FIG. 11A and FIG. 11B in which the gaps between the electrodes are filled in with infill of conductive material.

FIG. 11C is a variant of the embodiment of FIG. 11A and FIG. 11B in which the gaps between the X and Y electrodes, including the gaps G, are filled in with infill 35 of conductive material. FIG. 11C is to compare with FIG. 11B. The infill 35 comprises areas of conductive material, preferably the same conductive material as is used to make the electrodes, that are arranged to fill in the gaps in the electrode pattern between the X and Y electrodes, but in such a way that the infill areas remain electrically isolated from the X and Y electrodes, i.e. by maintaining a suitable gap free of conductive material adjacent their perimeters.

FIGS. 12A and 12B are schematic drawings of an embodiment. FIG. 12A shows an electrode pattern comprising a nominal 3×3 array of nodes with associated tracks and connection pads, whereas FIG. 12B shows a zoomed in portion of FIG. 12A in the immediate vicinity of one of the nodes. It will be appreciated that a commercial device will normally have a larger node array, but a 3×3 array is sufficient to show all aspects of the pattern, in particular at the x and y edges and corners as well as in the interior away from the edges.

For mutual capacitance measurements, we take the X electrodes as being connected to be operable as drive electrodes and the Y electrodes as being connected to be operable as sense electrodes. (However, the opposite arrangement is also possible, i.e. X is sense and Y is drive.) The X electrodes may be arranged below the Y electrodes, so that the Y electrodes are closer to the touch panel than the X electrodes. (However, the opposite ordering is also possible.)

The electrode pattern forms one or more layers of a capacitive touch sensor as described elsewhere in this document. The electrode pattern underlies a touch panel having on an upper side a touch surface and on a lower side an internal surface. The touch panel is made of a dielectric material. The electrode pattern may be embedded in a dielectric material, such as a suitable adhesive and/or be disposed on one side of a non-conductive substrate.

Elements of the basic structure are as described above in relation to FIG. 1 and FIG. 3. Referring to FIG. 12A, three rows of X electrodes 24 are connected to respective X-electrode tracks 14X which lead to connection pads 16X to ohmically couple each row of X electrodes to a touch-sensor controller Similarly, three columns of Y electrodes 26 are connected to respective Y-electrode tracks 14Y which lead to connection pads 16Y to ohmically couple each column of Y electrodes to a touch-sensor controller. The X electrodes are shown with lighter grey shading and the Y electrodes darker in the figure.

Each electrode has a branch structure with a central spine or trunk which is the part of the electrode that forms the nodes, and branches off the spine, which in turn may have branches from them also. We therefore refer to a spine as a zeroth order branch, a branch from the spine as a first order branch, a branch from the first order branch as a second order branch and so forth. The second, third, fourth etc. order branches are collectively referred to as higher order branches in contradistinction from the zeroth order branches.

The electrode pattern therefore comprises a set of X electrodes 24 each having a zeroth order branch (i.e. X-spine) extending in an x-direction and a set of Y electrodes 26 each having a zeroth order branch (i.e. Y-spine) extending in a y-direction transverse to the x-direction. Typically the x- and y-directions will be at right angles to each other, although this is not technically necessary. The zeroth order branches of the X and Y electrodes cross each other at crossing points 25 to form a two-dimensional array of nodes. The zeroth order branches of any two adjacent X electrodes and any two adjacent Y electrodes enclose a sub-area, which is square or rectangular in the case of x being orthogonal to y. It will be appreciated that in commercial devices, the sub-areas are most commonly square to provide the same touch resolution in the x and y directions.

The X and Y electrodes 24 and 26 each further comprise higher order branches of order n, each of which is confined to the sub-area into which it buds or branches. The value 'n' is a positive integer (i.e. 1, 2, 3 . . . ). An nth order branch buds from an (n−1)th order branch. Away from edges of the node array, each node is thus associated with four sub-areas.

Each X electrode 24 has first order branches 241, branching from its zeroth order branch 240, and second order branches 242 branching from its first order branches 241. The zeroth order branch 240 extends in the x direction. The first order branches 241 extend in the y direction. The second order branches 242 extend in the x direction. Each Y electrode 26 has first order branches 261, branching from its zeroth order branch 260. The zeroth order branch 260 extends in the y direction. The first order branches 261 extend in the x direction.

The zeroth order X and Y branches 240, 260 are narrowed at the crossing points 25 to reduce the area of crossing represented by the product of the respective widths of the X and Y zeroth order branches at the crossing point 25. In the plan view illustration, the Y branch 260 is shown passing over the X branch 240 in the manner of a bridge and river respectively. (Alternatively, the zeroth order X branch could pass over the zeroth order Y branch.)

Away from the narrowed regions near the crossing points 25, the zeroth order branches 240 of the X electrodes 24 have a width that is greater than the width of at least the co-extending ones of the higher order X electrode branches. In certain embodiments, the zeroth order X branches 240 are wider by a factor of at least one of 1.5, 2, 2.5, 3, 4, 5, 6, 7, 8, 9 and 10. In certain embodiments, the factor for the X branches is no more than at least one of 20, 18, 16, 14, 12, 10, 9, 8, 7, 6 and 5.

Away from the narrowed regions near the crossing points 25, the zeroth order branches 260 of the Y electrodes 26 have a width that is greater than the width of at least the co-extending ones of the higher order Y electrode branches. In certain embodiments, the zeroth order Y branches 260 are wider by a factor of at least one of 1.5, 2, 2.5, 3, 4, 5, 6, 7, 8, 9 and 10. In certain embodiments, the factor for the Y branches is no more than at least one of 20, 18, 16, 14, 12, 10, 9, 8, 7, 6 and 5.

Both the X and Y electrodes may be made wider and may have substantially the same widths as each other, or different widths. The x:y aspect ratio of the touch sensitive area may be equal to or greater than at least one of: 4:3, 3:2, 16:9 and 8:3. The zeroth order X-electrode width can be selected having regard to the aspect ratio so that the zeroth order X-electrode width is greater than the zeroth order Y-electrode width by at least approximately the x:y aspect ratio.

In each sub-area, certain ones of the higher order X and Y branches extend alongside one another separated by a gap 'G' suitable for making a mutual capacitance measurement of a touching object impinging on the touch surface. In the illustrated pattern, the co-extending higher order X and Y branches are first order Y branches 261 and second order X branches 242 which extend in the x direction. The co-extension is in the form of an interdigitation of fingers, the fingers being the above-mentioned higher order branches.

As can be seen from FIG. 12B, in each sub-area, the outermost second order X branches 242 (i.e. farthest from either side of the zeroth order branch in the y-direction) enclose the outermost (also in the y-direction) first order Y branches 261. These outermost second order X branches are given the reference numeral 242E. The mutual capacitances between the second order X branches and first order Y branches are thus substantially confined to, i.e. encapsulated in, the portion of the sub-area illustrated in FIG. 12B. In the y-direction, the outermost second order X branches 242E that provide the field encapsulation are directly adjacent to those of the neighbouring X electrode, i.e. there is no portion of Y electrode in between them. One of these pattern regions is marked with the dotted box labelled 'E' in FIG. 12A.

In particular, it can be seen that there is one more interdigitating X branch than Y branch (5 vs 4 in the illustration) so that all the interdigitating Y branches are enclosed by interdigitating X branches.

The exact number of co-extending higher order branches per sub-area can be varied as desired. For example, there may be 4, 5, 6, 7, 8, 9, 10 or more higher order X and 4, 5, 6, 7, 8, 9, 10 or more higher order Y branches that extend alongside one another.

In this embodiment, at least some of the zeroth and higher order branches of at least one of the X and Y electrodes are hollowed out to create hollowed-out areas 'h' absent of the conductive material from which the X and Y electrodes are made. (In the following, we sometimes refer to these hollowed-out areas as macro-areas, to distinguish them from the holes created by the mesh electrodes described further below, which we refer to as micro-areas.) Introducing hollows has the effect of reducing the area of coverage of the affected electrode compared with a solid electrode with the same perimeter. In each sub-area, the area covered collectively by the X and Y electrodes is thereby reduced in comparison with a solid electrode with the same perimeter. For example, the area covered collectively by the X and Y electrodes, including their zeroth and higher order branches, can be made less than one of 80%, 70%, 60%, 50%, 40%, 30%, 20%, and 10% of the sub-area. The area covered collectively by the X and Y electrodes can be greater than at least one of: 1%, 2%, 3%, 4%, 5%, 6%, 7%, 8%, 9%, 10%, 15% and 20%. It is noted that, for any particular noise level, below a certain fill factor self capacitance measurement may become practically impossible, so in some embodiments electrode patterns of this type may only be suitable for making mutual capacitance measurements. In the illustration, both X and Y zeroth order electrodes 240, 260 have hollows. All the first order Y branches 261 have hollows. Moreover, for the second order X electrodes 242, all but the outermost, encapsulating ones have hollows. The encapsulating second order X electrodes 242E remain solid. It will be appreciated that the design may be varied such that hollows are present in any order of X or Y electrode branches, as desired.

This design is favoured in a display stack where the display electrode layers are very close to the touch sensor electrode layer(s). In such cases, the self capacitance between the touch sensor electrode(s) and the display electrodes can be so large that it swamps any self capacitance between the sensor electrodes and a touch. In other words, the proximity of the display, means there is insufficient sensitivity to allow self capacitance measurements to be made of touches. If one accepts that self capacitance touch measurements cannot be made, then the electrode pattern can be optimised solely in relation to mutual capacitance touch measurements. Among other things, this means that the rationale for having large conductive areas on the touch electrodes is no longer present, so that the electrodes can be reduced in area. Reducing electrode area increases resistance, but also reduces the electrodes' self capacitance, so that charge time can be kept low enough to be acceptable. Reducing overall electrode area also lends itself to realizing a high number of interdigitated higher order electrode branches.

Figure 12C:
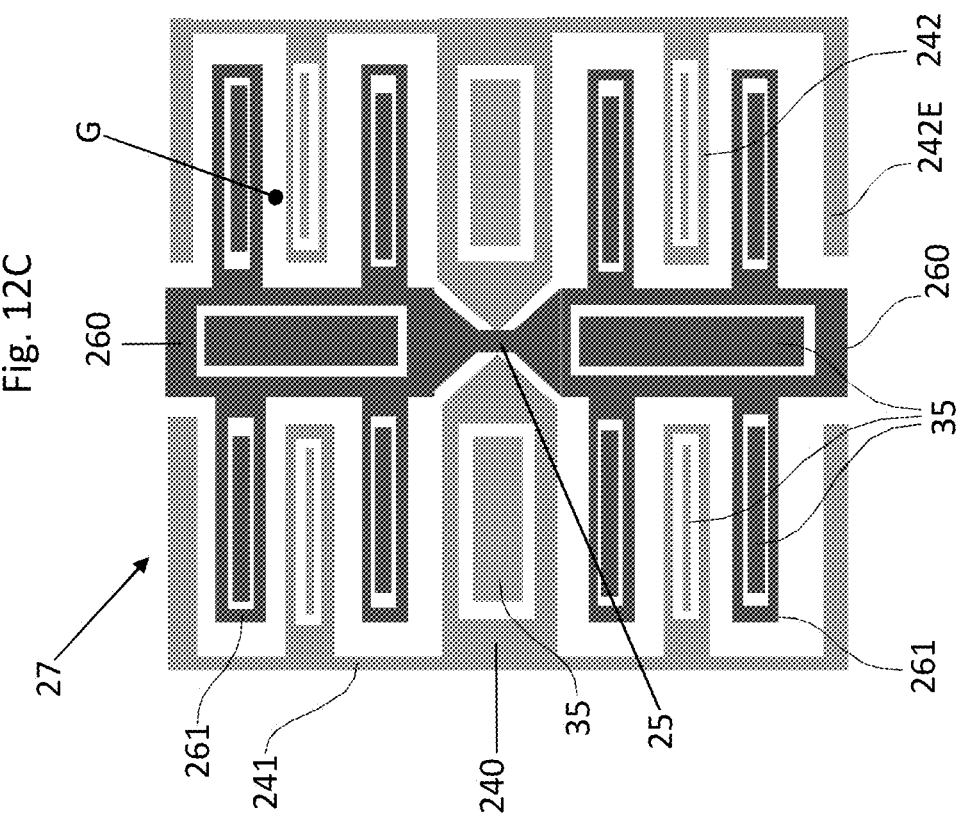
FIG. 12C is a variant of the embodiment of FIG. 12A and FIG. 12B.

FIG. 12C is a variant of the embodiment of FIG. 12A and FIG. 12B in which the hollows 'h' are filled in with islands of infill 35 of conductive material. FIG. 12C is to compare with FIG. 12B. These infill islands 35 are areas of conductive material, preferably the same conductive material as is used to make the electrodes, that are arranged to fill in gaps in the electrode pattern, but in such a way that the islands remain electrically isolated from the X and Y electrodes, i.e. by maintaining a suitable gap free of conductive material adjacent their perimeters.

FIGS. 13A and 13B are schematic drawings of an embodiment. FIG. 13A shows an electrode pattern comprising a nominal 3×3 array of nodes with associated tracks and connection pads, whereas FIG. 13B shows a zoomed in portion of FIG. 13A in the immediate vicinity of one of the nodes. It will be appreciated that a commercial device will normally have a larger node array, but a 3×3 array is sufficient to show all aspects of the pattern, in particular at the x and y edges and corners as well as in the interior away from the edges.

For mutual capacitance measurements, we take the X electrodes as being connected to be operable as drive electrodes and the Y electrodes as being connected to be operable as sense electrodes. (However, the opposite arrangement is also possible, i.e. X is sense and Y is drive.) The X electrodes may be arranged below the Y electrodes, so that the Y electrodes are closer to the touch panel than the X electrodes. (However, the opposite ordering is also possible.)

The electrode pattern forms one or more layers of a capacitive touch sensor as described elsewhere in this document. The electrode pattern underlies a touch panel having on an upper side a touch surface and on a lower side an internal surface. The touch panel is made of a dielectric material. The electrode pattern may be embedded in a dielectric material, such as a suitable adhesive and/or be disposed on one side of a non-conductive substrate.

Elements of the basic structure are as described above in relation to FIG. 1 and FIG. 3. Referring to FIG. 13A, three rows of X electrodes 24 are connected to respective X-electrode tracks 14X which lead to connection pads 16X to ohmically couple each row of X electrodes to a touch-sensor controller Similarly, three columns of Y electrodes 26 are connected to respective Y-electrode tracks 14Y which lead to connection pads 16Y to ohmically couple each column of Y electrodes to a touch-sensor controller. The X electrodes are shown with lighter grey shading and the Y electrodes darker in the figure.

Each electrode has a branch structure with a central spine or trunk which is the part of the electrode that forms the nodes, and branches off the spine, which in turn may have branches from them also. We therefore refer to a spine as a zeroth order branch, a branch from the spine as a first order branch, a branch from the first order branch as a second order branch and so forth. The second, third, fourth etc. order branches are collectively referred to as higher order branches in contradistinction from the zeroth order branches.

The electrode pattern therefore comprises a set of X electrodes 24 each having a zeroth order branch (i.e. X-spine) extending in an x-direction and a set of Y electrodes 26 each having a zeroth order branch (i.e. Y-spine) extending in a y-direction transverse to the x-direction. Typically the x- and y-directions will be at right angles to each other, although this is not technically necessary. The zeroth order branches of the X and Y electrodes cross each other at crossing points 25 to form a two-dimensional array of nodes. The zeroth order branches of any two adjacent X electrodes and any two adjacent Y electrodes enclose a sub-area, which is square or rectangular in the case of x being orthogonal to y. It will be appreciated that in commercial devices, the sub-areas are most commonly square to provide the same touch resolution in the x and y directions.

The X and Y electrodes 24 and 26 each further comprise higher order branches of order n, each of which is confined to the sub-area into which it buds or branches. The value 'n' is a positive integer (i.e. 1, 2, 3 . . . ). An nth order branch buds from an (n−1)th order branch. Away from edges of the node array, each node is thus associated with four sub-areas.

Each X electrode 24 has first order branches 241, branching from its zeroth order branch 240, and second order branches 242 branching from its first order branches 241. The zeroth order branch 240 extends in the x direction. The first order branches 241 extend in the y direction. The second order branches 242 extend in the x direction. Each Y electrode 26 has first order branches 261, branching from its zeroth order branch 260. The zeroth order branch 260 extends in the y direction. The first order branches 261 extend in the x direction.

The zeroth order X and Y branches 240, 260 are narrowed at the crossing points 25 to reduce the area of crossing represented by the product of the respective widths of the X and Y zeroth order branches at the crossing point 25. In the plan view illustration, the Y branch 260 is shown passing over the X branch 240 in the manner of a bridge and river respectively. (Alternatively, the zeroth order X branch could pass over the zeroth order Y branch.)

Away from the narrowed regions near the crossing points 25, the zeroth order branches 240 of the X electrodes 24 have a width that is greater than the width of at least the co-extending ones of the higher order X electrode branches. In certain embodiments, the zeroth order X branches 240 are wider by a factor of at least one of 1.5, 2, 2.5, 3, 4, 5, 6, 7, 8, 9 and 10. In certain embodiments, the factor for the X branches is no more than at least one of 20, 18, 16, 14, 12, 10, 9, 8, 7, 6 and 5.

Away from the narrowed regions near the crossing points 25, the zeroth order branches 260 of the Y electrodes 26 have a width that is greater than the width of at least the co-extending ones of the higher order Y electrode branches. In certain embodiments, the zeroth order Y branches 260 are wider by a factor of at least one of 1.5, 2, 2.5, 3, 4, 5, 6, 7, 8, 9 and 10. In certain embodiments, the factor for the Y branches is no more than at least one of 20, 18, 16, 14, 12, 10, 9, 8, 7, 6 and 5.

Both the X and Y electrodes may be made wider and may have substantially the same widths as each other, or different widths. The x:y aspect ratio of the touch sensitive area may be equal to or greater than at least one of: 4:3, 3:2, 16:9 and 8:3. The zeroth order X-electrode width can be selected having regard to the aspect ratio so that the zeroth order X-electrode width is greater than the zeroth order Y-electrode width by at least approximately the x:y aspect ratio.

In each sub-area, certain ones of the higher order X and Y branches extend alongside one another separated by a gap 'G' suitable for making a mutual capacitance measurement of a touching object impinging on the touch surface. In the illustrated pattern, the co-extending higher order X and Y branches are first order Y branches 261 and second order X branches 242 which extend in the x direction. The co-extension is in the form of an interdigitation of fingers, the fingers being the above-mentioned higher order branches.

As can be seen from FIG. 13B, in each sub-area, the outermost second order X branches 242 (i.e. farthest from either side of the zeroth order branch in the y-direction) enclose the outermost (also in the y-direction) first order Y branches 261. These outermost second order X branches are given the reference numeral 242E. The mutual capacitances between the second order X branches and first order Y branches are thus substantially confined to, i.e. encapsulated in, the portion of the sub-area illustrated in FIG. 13B. In the y-direction, the outermost second order X branches 242E that provide the field encapsulation are directly adjacent to those of the neighbouring X electrode, i.e. there is no portion of Y electrode in between them. One of these pattern regions is marked with the dotted box labelled 'E' in FIG. 13A.

In particular, it can be seen that there is one more interdigitating X branch than Y branch (5 vs 4 in the illustration) so that all the interdigitating Y branches are enclosed by interdigitating X branches.

The exact number of co-extending higher order branches per sub-area can be varied as desired. For example, there may be 4, 5, 6, 7, 8, 9, 10 or more higher order X and 4, 5, 6, 7, 8, 9, 10 or more higher order Y branches that extend alongside one another.

In this embodiment, at least some of the higher order X and/or Y branches are narrowed, thereby to reduce said coverage. The zeroth order X and/or Y branches may also be narrowed. Narrowing the electrodes has the effect of reducing the area of coverage of the affected electrode. In each sub-area, the area covered collectively by the X and Y electrodes is thereby reduced in comparison with a conventional design where it is aimed to fill as much as possible of the sub-area with electrode pattern. For example, the area covered collectively by the X and Y electrodes, including their zeroth and higher order branches, can be made less than one of 80%, 70%, 60%, 50%, 40%, 30%, 20%, and 10% of the sub-area. The area covered collectively by the X and Y electrodes can be greater than at least one of: 1%, 2%, 3%, 4%, 5%, 6%, 7%, 8%, 9%, 10%, 15% and 20%. It is noted that, for any particular noise level, below a certain fill factor self capacitance measurement may become practically impossible, so in some embodiments electrode patterns of this type may only be suitable for making mutual capacitance measurements. In the illustration, electrode narrowing is carried out in both X and Y electrodes 24, 26. Other embodiments may narrow only one of X and Y. Moreover the narrowing may be carried out similarly in X and Y, or differently in X and Y, as desired.

Figure 14A:
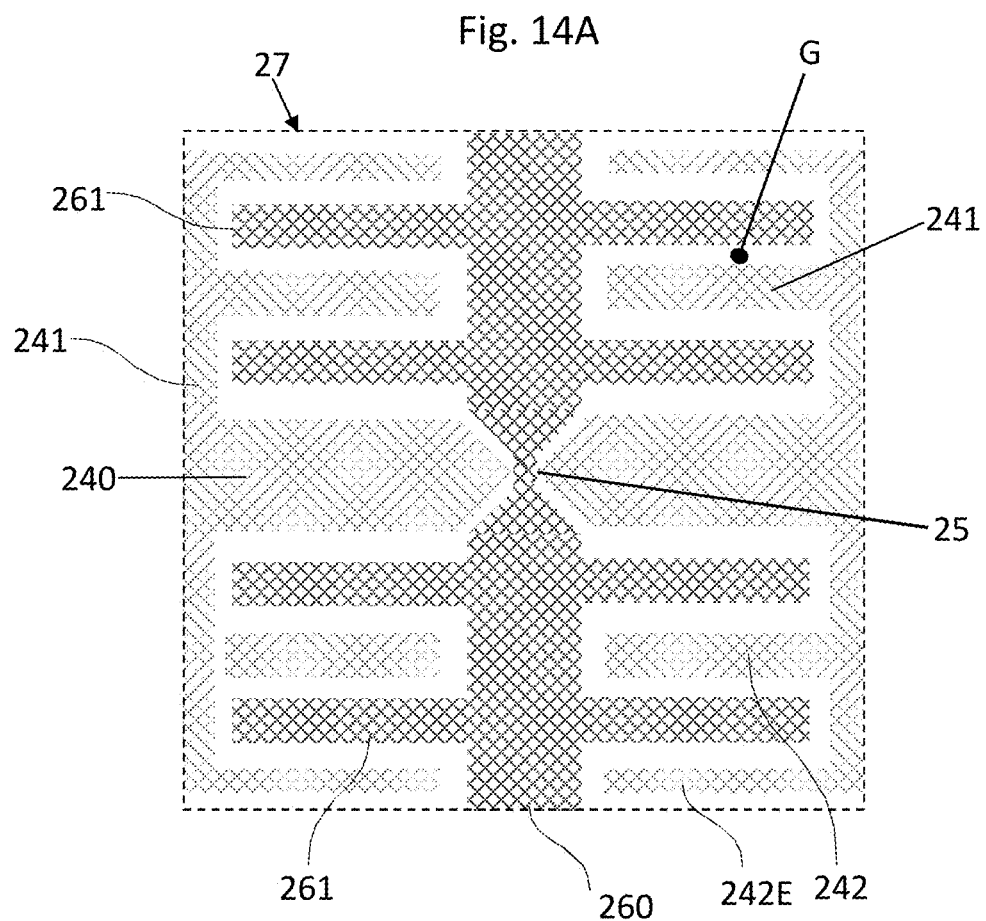
FIGS. 14A, 14B and 14C are schematic drawings in plan view of a still further embodiment with the electrodes having a fine mesh structure.
Figure 14B:
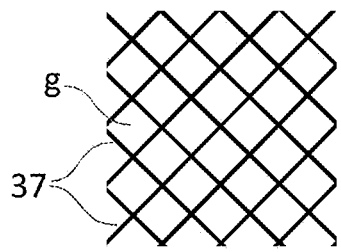

FIGS. 14A and 14B are schematic drawings of an embodiment. The overall pattern at the macro level is the same as in the embodiment of FIG. 11A and FIG. 11B. However, instead of having solid electrodes, i.e. electrodes each made of a continuous blanket of conductive material, the electrodes are made of a mesh of conductive material. FIG. 14A is to be compared with FIG. 11B in that it has the same macro level pattern, but with mesh instead of solid electrodes. It will be appreciated that the larger scale structure of this embodiment will look like FIG. 11A at the macro level. FIG. 14B shows a detail of the mesh of one of the electrodes of FIG. 14A, e.g. the Y electrode, from which it is evident that the mesh comprises criss-crossing continuous lines 37 of conductive material with gaps 'g' (micro-gaps) in between that are free of conductive material.

Figure 14C:
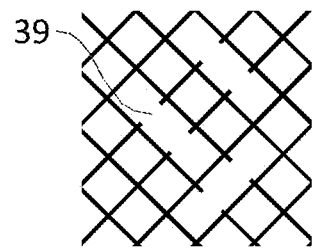

FIGS. 14C is a schematic drawing of a variant of the embodiment of FIGS. 14A and 14B in which not all the criss-cross lines of conductive material that make up the mesh are continuous. This variant is shown to illustrate the principle that the mesh of any given electrode or electrode branch needs to have a continuous conductive path overall in order to be part of the same electrode, but can include breaks or interruptions 39 formed by absence of individual length portions of the criss-crossing conductive lines that form the mesh structure.

More generally it is noted that any of the macro-level electrode patterns described herein can have part or all of their structure substituted with mesh, such as those shown in FIG. 14B and FIG. 14C. Moreover, if there are any isolated islands of conductive material in a given structure, these too can be formed of mesh, such as those shown in FIG. 14B and FIG. 14C.

Figure 15A:
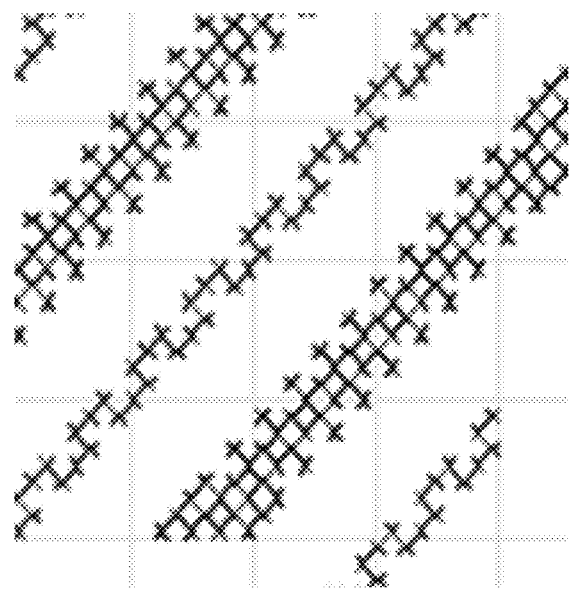
FIGS. 15A and 15B show portions of example electrode branches with fine mesh structure.
Figure 15B:
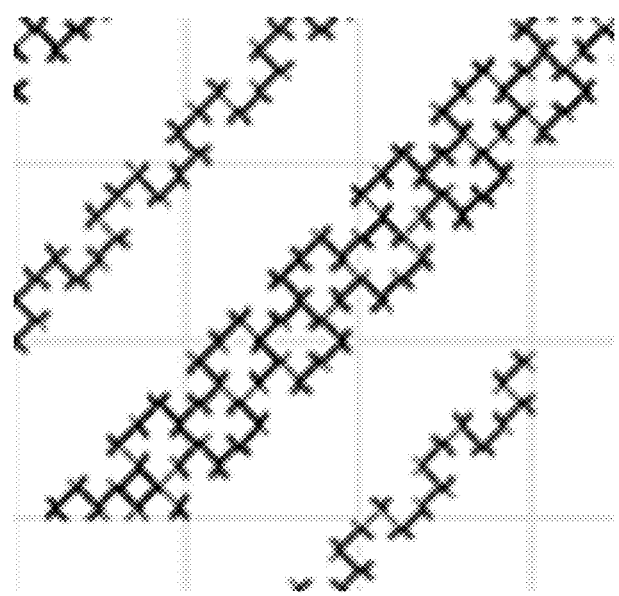

FIGS. 15A and 15B show portions of example electrode branches with fine mesh structure. In FIG. 15A, breaks in the mesh are applied to the lateral edges of the electrode branch (or infill). In FIG. 15B, breaks in the mesh are applied to both the lateral edges of the electrode branch (or infill) and inside the electrode branch away from the lateral edges.

Figure 16:
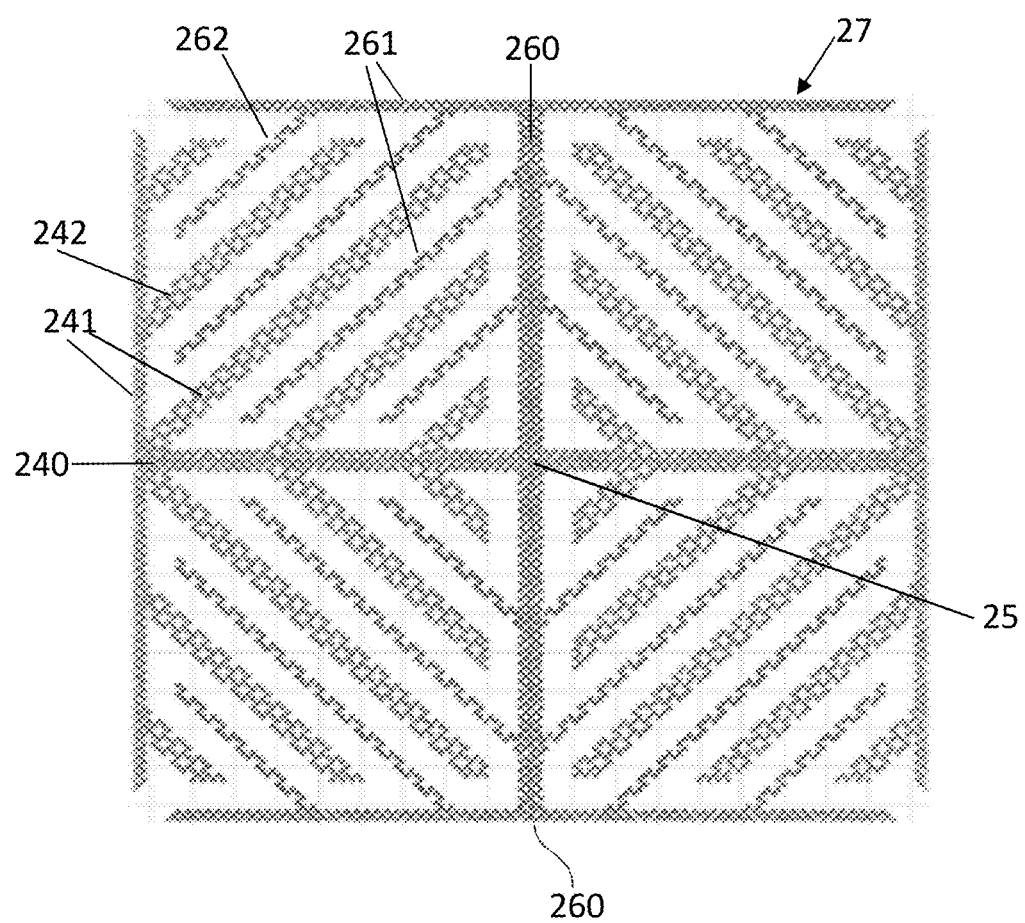
FIG. 16 is a schematic drawing in plan view of a node area of an embodiment electrode pattern where the electrodes are made of conductive material mesh, where the overall pattern at the macro-level is the same as shown in FIGS. 5, 6A and 6B.

FIG. 16 is a schematic drawing in plan view of a node area of an embodiment electrode pattern where the electrodes are made of conductive material mesh, but where the overall pattern at the macro-level is the same as shown in FIGS. 5, 6A and 6B. The same reference numerals as FIG. 6A are used to label corresponding features.

Figure 17:
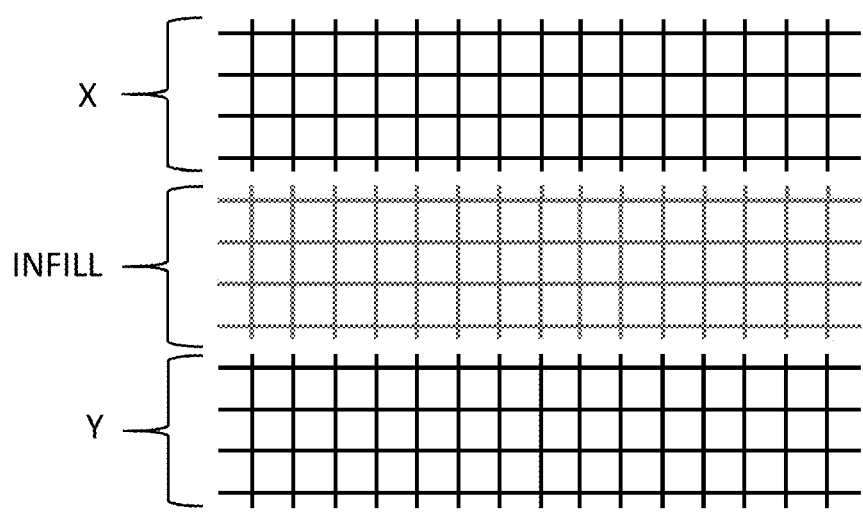
FIG. 17 shows portions of and example structure in which two co-extending higher order X and Y electrode branches are separated by an infill, the electrode branches and infill all having a fine mesh structure.

FIG. 17 shows in schematic plan view detail of three co-extending mesh portions. These are labelled as X, infill and Y, since they could be co-extending higher order X and Y branches with an infill co-extending between them. It is therefore apparent to the skilled person, that the gap between co-extending pairs of higher order X and Y electrodes, i.e. the parameter relevant for mutual capacitance measurements, may in some embodiments be partially filled by an infill of electrode material which however remains electrically isolated from the adjacent X and Y electrode branches.

Alternatively, the same mesh structure as shown in FIG. 17 could represent interdigitating electrodes with no infill, i.e. X-Y-X or Y-X-Y Similarly, for encapsulated node designs, such as FIG. 11A and FIG. 11B, these three co-extending mesh portions could represent a sequence X-X-Y at a node boundary.

Figure 18:
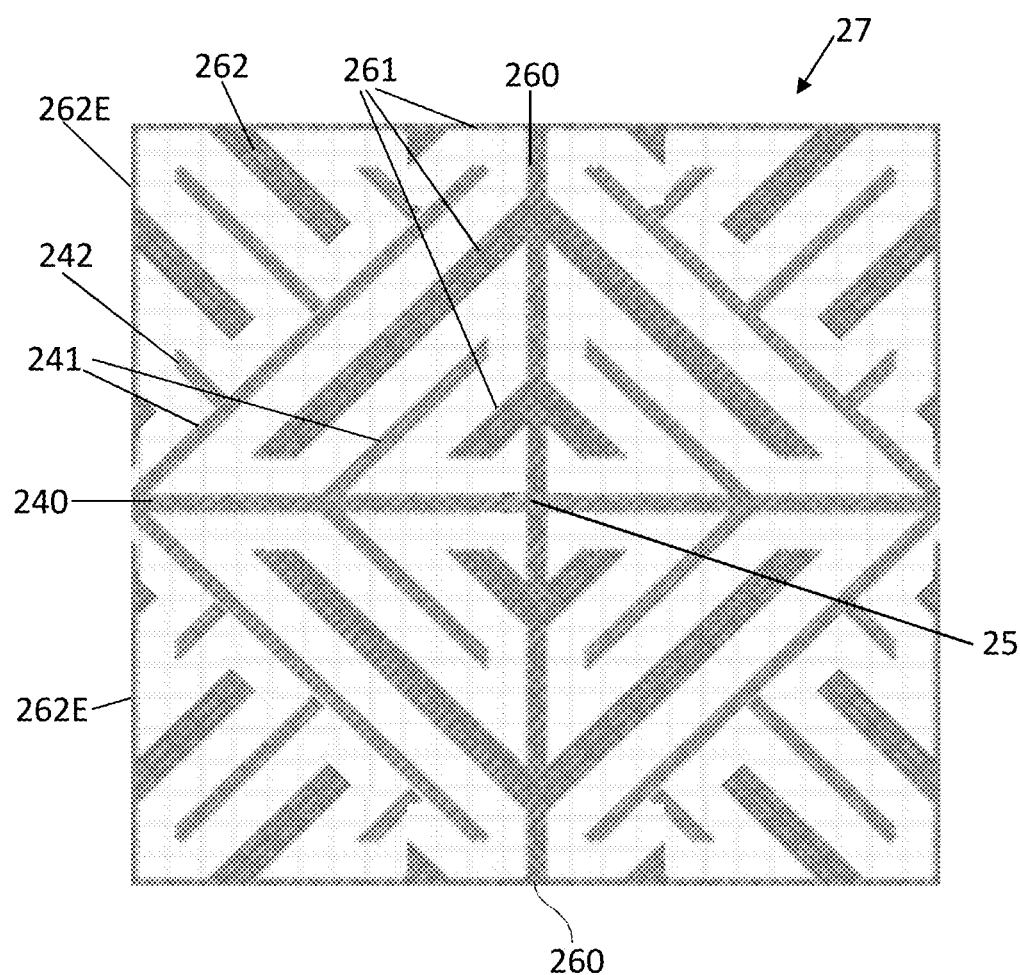
FIG. 18 shows a variant of the electrode pattern of FIG. 6A.

FIG. 18 shows a variant of the electrode pattern of FIG. 6A which has encapsulating Y-electrode portions 262E at the node boundaries similar to the embodiment of FIG. 11A and FIG. 11B, for example. The other reference numerals will be understood with reference to previous embodiments.

Figure 19:
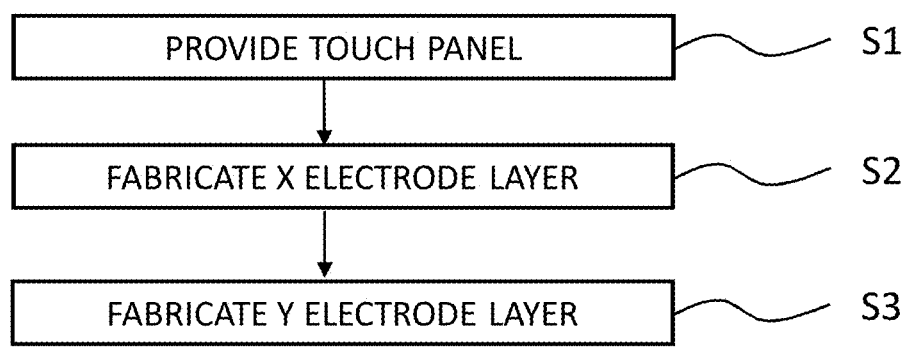
FIG. 19 is a flow diagram showing a method of manufacturing a device incorporating a capacitive touch sensor.

FIG. 19 is a flow diagram showing a method of manufacturing a device incorporating a capacitive touch sensor according to embodiments of the disclosure. In Step S1 there is provided a touch panel having on an upper side a touch surface and on a lower side an internal surface, the touch panel being made of a dielectric material. In Step S2 a set of X electrodes is fabricated with the X electrodes being arranged under the touch panel and having a zeroth order branch extending in an x direction. In Step S3, a set of Y electrodes is fabricated with the Y electrodes being arranged under the touch panel and having a zeroth order branch extending in a y direction different from the x direction. The fabrication is such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3. The X and Y electrodes may be fabricated in the same layer or in different layers separated by a dielectric material layer. The area covered by the X electrodes is at least approximately the same as the area covered by the Y electrodes, so that the self capacitance of the X electrodes and the self capacitance of the Y electrodes are at least approximately the same.

Figure 20:
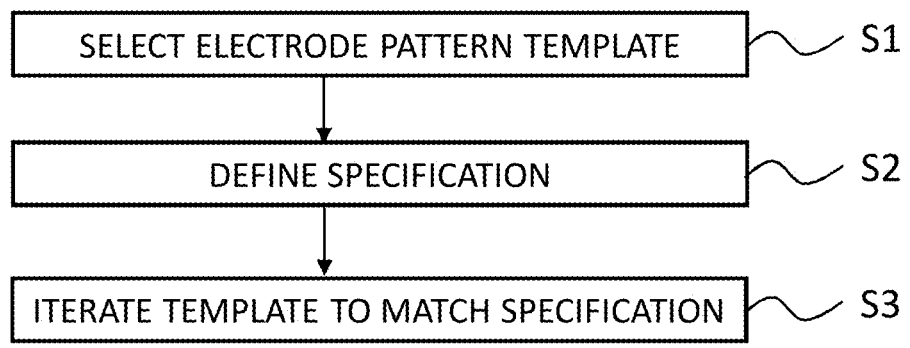
FIG. 20 is a flow diagram showing a computer automated method for designing an electrode pattern for a capacitive touch sensor.

FIG. 20 is a flow diagram showing a computer automated method for designing an electrode pattern for a capacitive touch sensor. In Step S1, an electrode pattern template is selected that relates to an electrode pattern. The pattern template defines a pattern having: (a) a set of X electrodes having a zeroth order branch extending in an x direction and a plurality of higher order branches; (b) a set of Y electrodes having a zeroth order branch extending in a y direction different from the x direction, such that the zeroth order branches of the X and Y electrodes cross each other at crossing points to form a two-dimensional array of nodes which defines a touch sensitive area, the set of Y electrodes further comprising a plurality of higher order branches, and wherein at least some of the higher order X and Y branches extend alongside one another separated by a gap. In Step S2, a specification is generated for the desired electrode pattern. The specification specifies: (a) lateral dimensions in x and y directions for the touch sensitive area; (b) a number of nodes in each of the x and y directions for the touch sensitive area which correspond to the number of Y and X electrodes respectively; and (c) at least one area parameter for the X and Y electrodes; and optionally (d) a desired ratio of the areas of the X and Y electrodes. In Step S3, the method generates an electrode pattern by varying dimensional parameters, e.g. iteratively, within the electrode pattern template affecting at least one of the zeroth order and higher order branches of at least one of the X and Y electrodes in order that the generated electrode pattern meets the specification. The desired ratio of the areas of the X and Y electrodes may be unity or different from one. The method may generate multiple candidate patterns that meet the specification in which case a designer can make a manual selection between them based on his or her expert knowledge.

It will be understood that elements of different ones of the above described embodiments may be combined in any desired manner to arrive at variants of the disclosed electrode patterns.

Stack Configurations

By way of example we now describe various specific stack implementations for LCD and OLED touch screens. In these implementations, it will be appreciated that one or more adhesive layers (e.g., OCA) may be used to bind layers of the display and touch sensor stack together, but these are not illustrated. Moreover, in these implementations, it will be understood that the touch panel is optically transparent in the visible region in order to be suitable for display applications and is made of a resilient material suitable for acting as the touch surface, such as for example a suitable glass or plastics material. Suitable plastics materials include polycarbonate (PC) and polymethyl methacrylate (PMMA). Further, it will be understood that embodiments may also be realised with other stack implementations, such as for example those described in US 2014/0226089 A1 (Atmel Corporation) and US 2016/259481 A1 (LG Electronics, Inc.), the entire contents of which are incorporated herein by reference.

Figure 21:
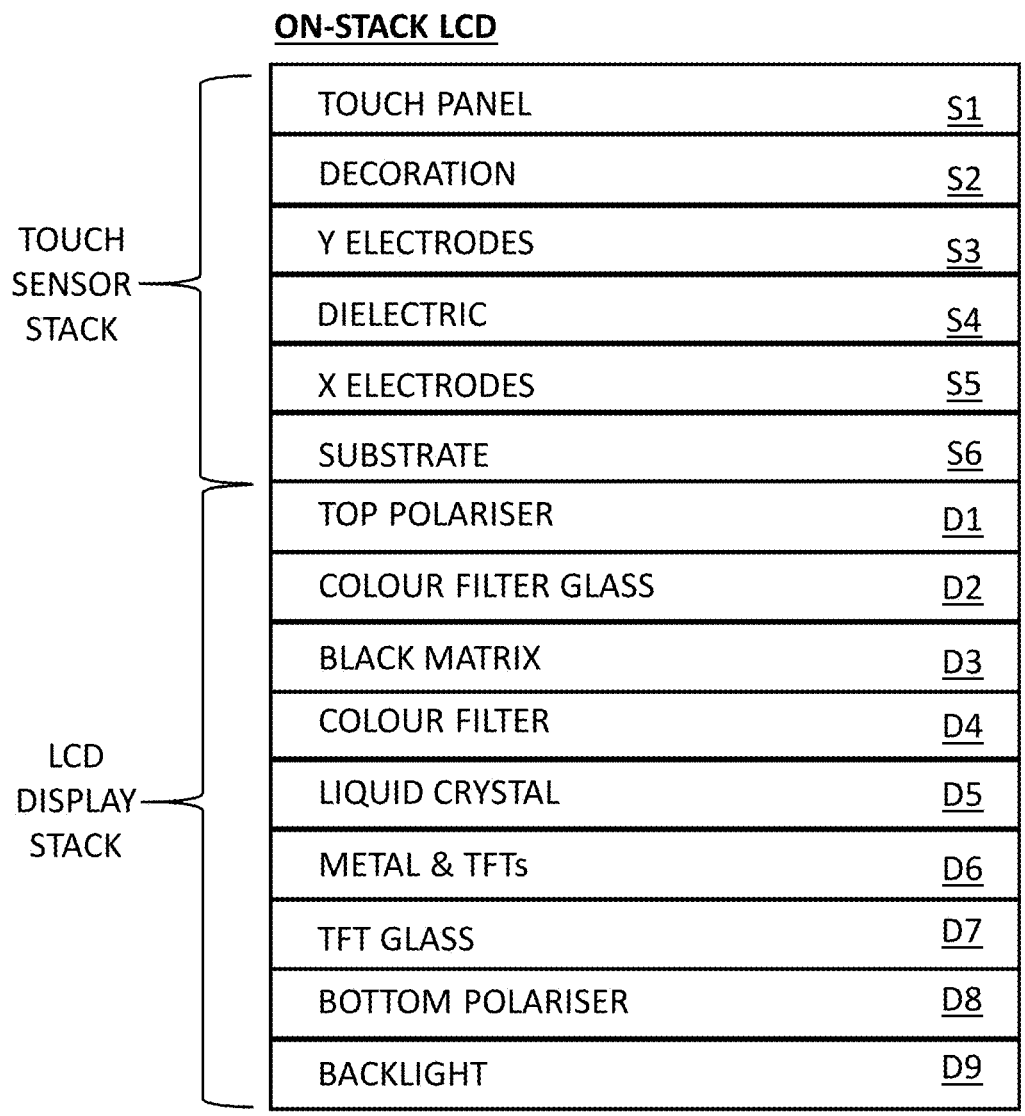
FIG. 21 shows a sensor and display stack of an on-stack LCD embodiment of the disclosure.

FIG. 21 shows a sensor and display stack of an on-stack LCD embodiment of the disclosure. An on-stack design refers to the fact that the touch sensor is arranged on top of and is a separate sub-assembly from the display, each operating effectively independently. The LCD display stack starts with a backlight unit, then a bottom polariser and a glass layer to act as a substrate for the thin film transistors (TFTs). The TFTs together with their addressing and other electrodes, referred to as metal, are arranged in top of the TFT glass. It will be understood that reference to metal includes any suitable metallically conductive material, it often being the case that ITO is used (i.e. a non-metal), since it is transparent and therefore suitable for display applications. For other applications, the electrode material may be opaque. The next layer is the liquid crystal layer followed by a colour filter layer. It will be appreciated that suitable spacers will be provided to maintain a design thickness for the liquid crystal layer. Next there is a black matrix layer for contrast enhancement, colour filter glass, and finally a top polariser. It will be appreciated that additional layers, such as adhesive, coatings and so forth may also be included as desired. Moreover, some of the recited layers could be omitted, for example the black matrix. A simpler structure would also result if the display was monochrome. The touch sensor stack is arranged on top of the display stack and commences with a substrate, made of a material such as a glass material (e.g. an alkali aluminosilicate glass) or a plastics material (e.g. PET) for example, on which the X electrodes are deposited. The X electrodes may be embedded in a dielectric matrix, such as an adhesive layer. On top of the X electrodes there is a dielectric and then the Y electrodes. It will be appreciated that in a single layer design, the substrate would be the dielectric and the X & Y electrodes would be arranged thereon, thereby removing two of the illustrated layers. There then follows an optional decoration layer followed by a touch panel. The touch panel may be a glass or a plastics material. Moreover, the touch panel may be coated, e.g. with an anti-scratch material for increased hardness and/or wear resistance.

Figure 22:
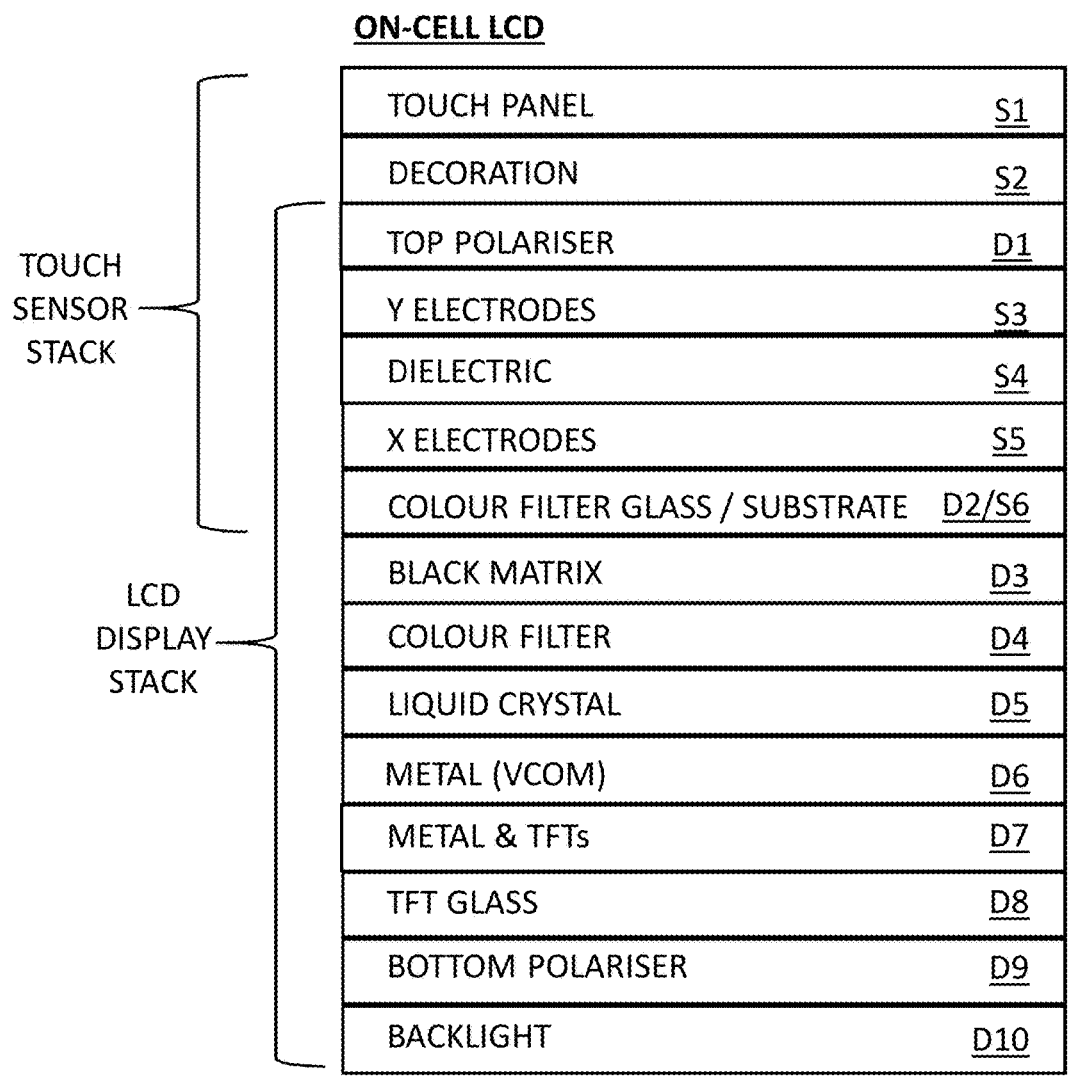
FIG. 22 shows a sensor and display stack of an on-cell LCD embodiment of the disclosure.

FIG. 22 shows a sensor and display stack of an on-cell LCD embodiment of the disclosure. The term on-cell refers to the fact that the touch sensor uses the uppermost display stack layer, namely the colour filter glass, as the substrate for the initial layer of the sensor stack, namely the X electrodes. Compared with the on-stack design of FIG. 21, the only other change is that the top polariser has been moved to be above the touch sensor layers for the X and Y electrodes which reduces the visibility of the touch sensor electrode pattern.

Figure 23:
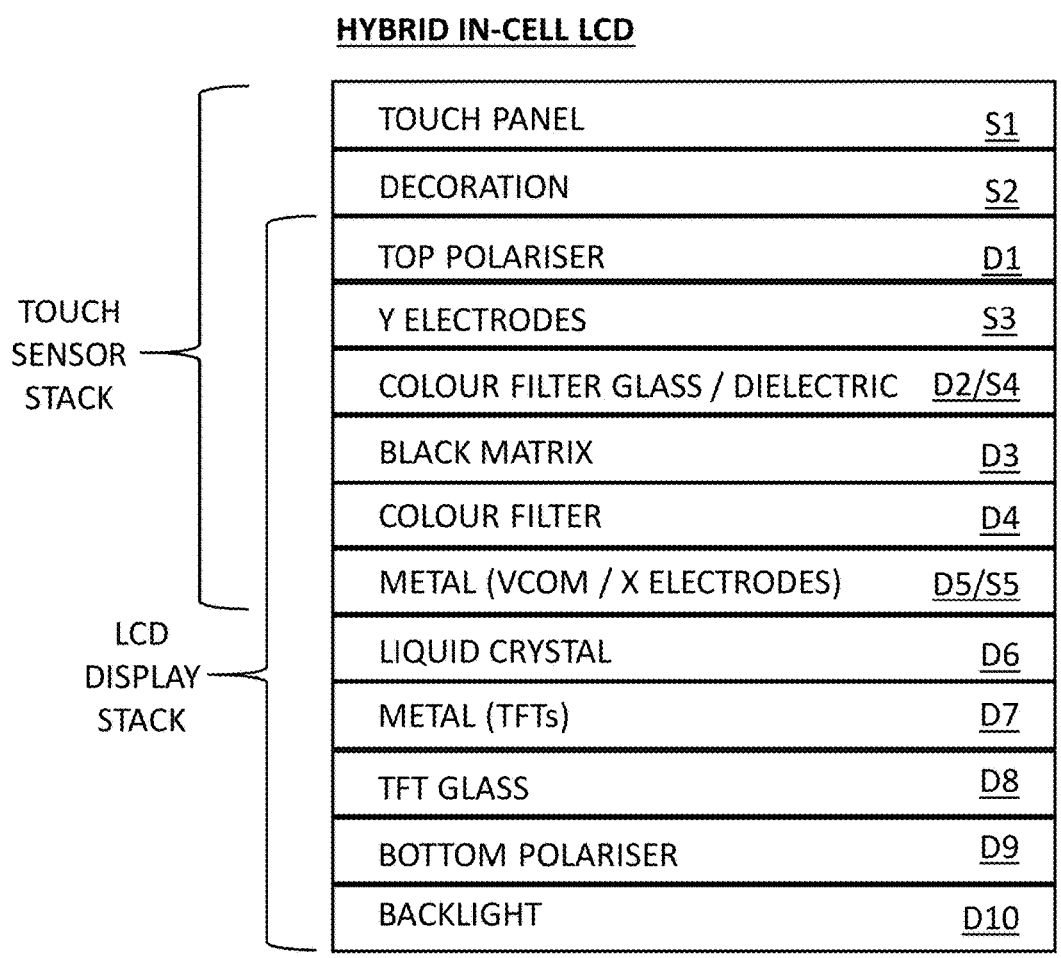
FIG. 23 shows a sensor and display stack of a hybrid in-cell LCD embodiment of the disclosure.

FIG. 23 shows a sensor and display stack of a hybrid in-cell LCD embodiment of the disclosure. The term in-cell refers to the fact that the touch sensor is more fully integrated within the display stack in that at least one of the touch sensor layers is arranged below the display's colour filter. In particular, some of the display driver electrodes (the VCOM electrodes that provide a reference voltage for the TFTs) can perform a dual function as touch sensor electrodes (the X electrodes), their functional separation being achieved by time multiplexing, i.e. for part of a cycle the electrodes are used for the display and for another part of the cycle for touch sensing. The dual function is achieved by patterning the VCOM electrode layer, which in an LCD without touch sensor is simply an unstructured blanket. For in-cell designs, there are two possibilities: "one-sided" in-cell if both X and Y sensor electrode layers below the colour filter glass, and "two-sided" or "hybrid" in-cell if only one of the X and Y sensor electrode layers moves below the colour filter glass. In a hybrid in-cell design, the electrode layer above the colour filter glass, nearest to the touch panel, will be the layer used for sense (i.e. Y electrode) in a mutual capacitance measurements. It will be appreciated that in an in-cell design, the electronics driving the display and the touch sensor need to be coordinated, so that either one single IC is provided for jointly controlling the display and touch sensor, or, if dedicated display and touch-sensor controller ICs are retained, they need to exchange data to ensure coordination.

Figure 24:
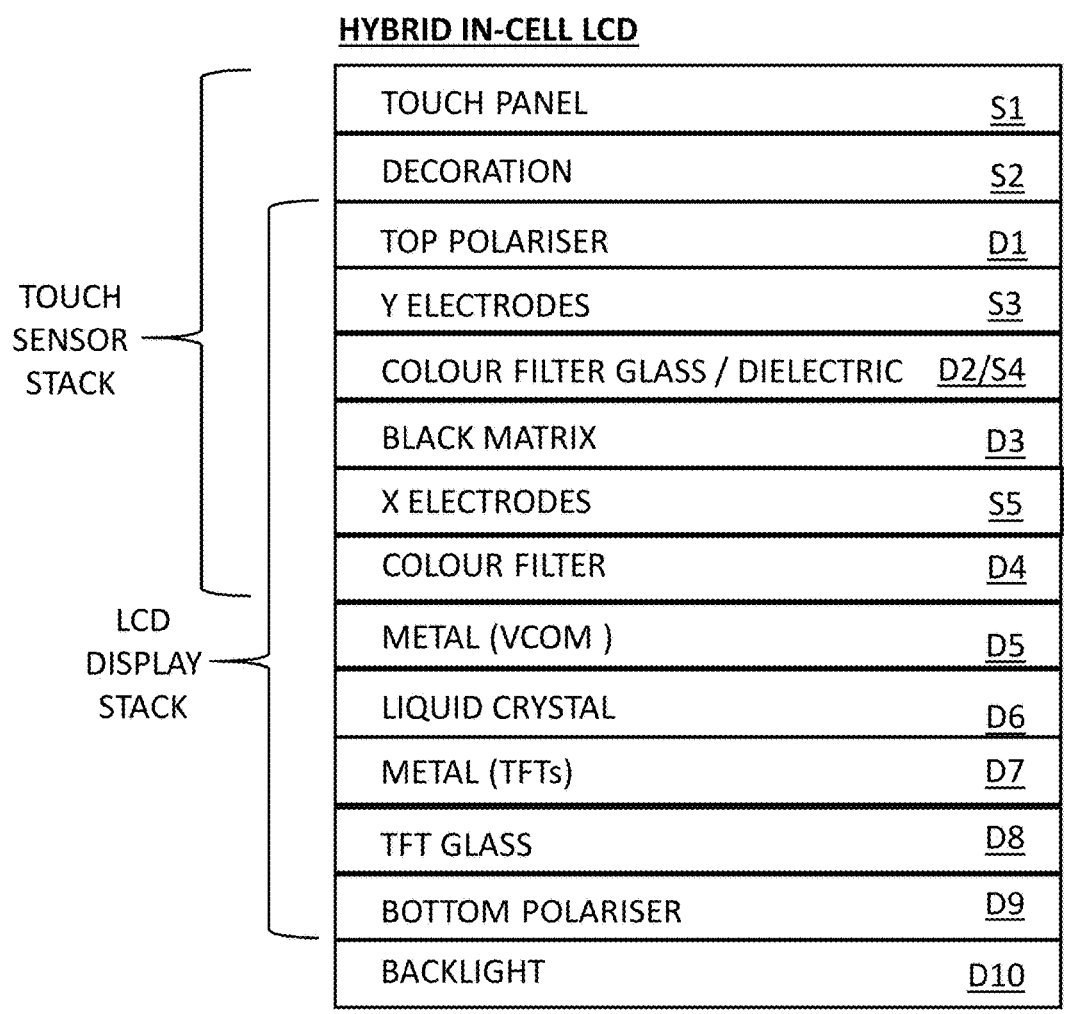
FIG. 24 shows a sensor and display stack of another hybrid in-cell LCD embodiment of the disclosure.

FIG. 24 shows a sensor and display stack of another hybrid in-cell LCD embodiment of the disclosure. In comparison to the stack of FIG. 23, the X electrodes are not integrated with the VCOM so that capacitive sensing measurements can take place in parallel with driving the display. The X electrodes are arranged on the colour filter. It is illustrated that the X electrodes are arranged on the upper side of the colour filter, but they could be arranged on the lower side. Moreover, a separate substrate layer for supporting the X electrodes could be provided.

Figure 25:
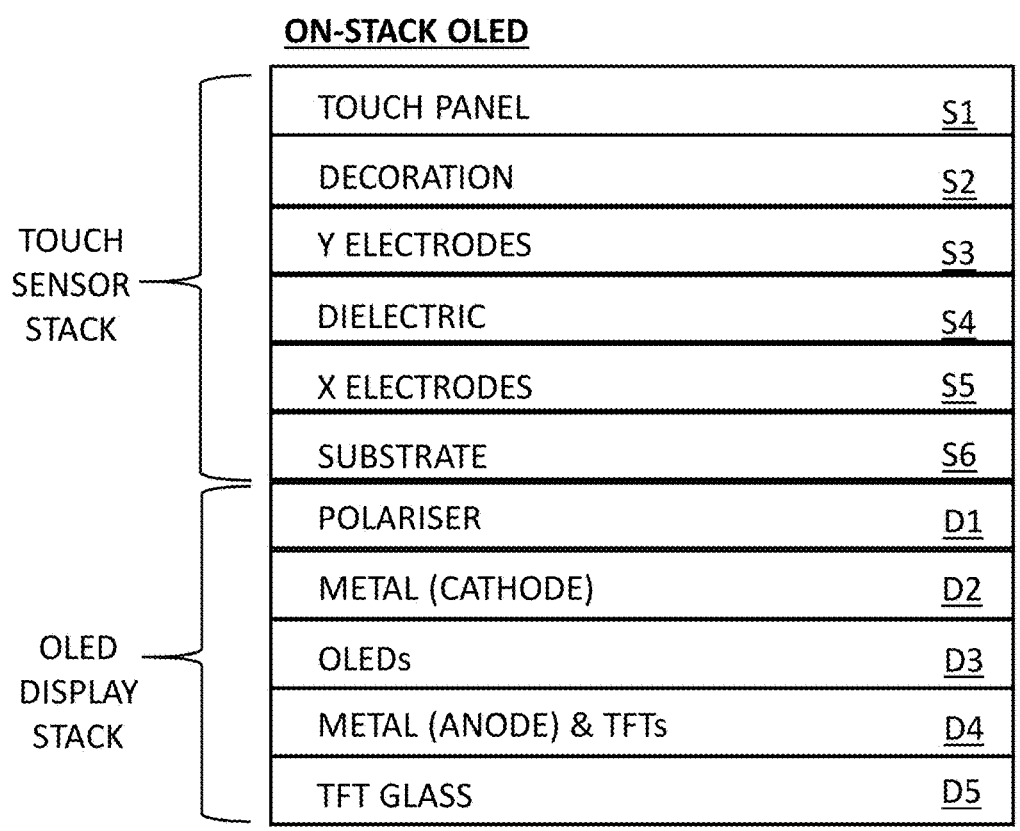
FIG. 25 shows a sensor and display stack of an on-stack OLED embodiment of the disclosure.

FIG. 25 shows a sensor and display stack of an on-stack OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. Finally, the display stack is completed by a polariser. For an OLED, it is noted that generally a colour filter and colour filter glass is not needed. However, for white OLEDs, they may be provided in which case those layers would be arranged above the OLEDs and below the metal (cathode) layer. It will also be appreciated that additional layers, such as adhesive, coatings and so forth may also be included as desired. The touch sensor stack is arranged on top of the display stack's cathode electrode layer and commences with a substrate on which the X electrodes are deposited. The X electrodes may be embedded in a dielectric matrix, such as an adhesive layer. On top of the X electrodes there is a dielectric and then the Y electrodes. There then follows an optional decoration layer followed by a touch panel. The touch panel may be a glass or a plastics material. Moreover, the touch panel may be coated, e.g. with an anti-scratch material for increased hardness and/or wear resistance.

Figure 26:
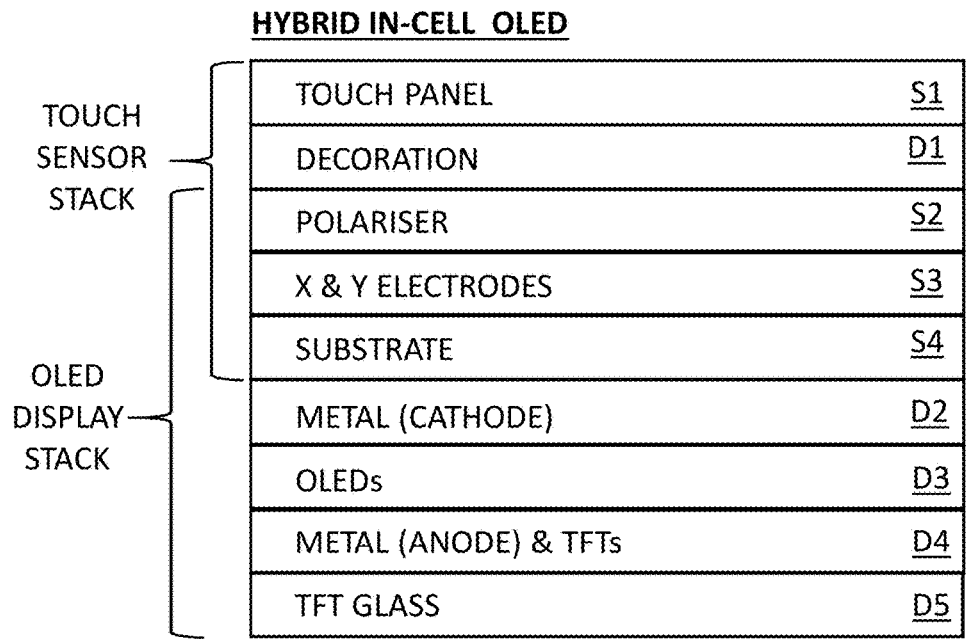
FIG. 26 shows a sensor and display stack of a hybrid in-cell OLED embodiment of the disclosure.

FIG. 26 shows a sensor and display stack of a hybrid in-cell OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. The display stack is completed by a polariser, but in this embodiment the polariser is arranged above the touch sensor electrodes. Placing the polariser above the touch sensor electrodes has the advantage that the polariser partly obscures the pattern of the touch sensor electrodes, which would otherwise be more visible to a user under a wider variety of lighting conditions and angles of view. It will also be appreciated that additional layers, such as adhesive, coatings and so forth may also be included as desired. A slightly different structure could also result if the display was monochrome. Touch sensor stack layers are arranged on top of the display stack's cathode layer. The first touch sensor stack layer is a substrate. The X & Y electrodes are then formed in a single layer, and may be embedded in a dielectric matrix, such as an adhesive layer. There then follows the above-mentioned polariser for the display stack an optional decoration layer followed by a touch panel. The touch panel may be a glass or a plastics material. Moreover, the touch panel may be coated, e.g. with an anti-scratch material for increased hardness and/or wear resistance. Some common variations to this stack are as follows. We also note that the general comments on in-cell designs made in relation to the above hybrid in-cell LCD embodiments also apply to this in-cell OLED embodiment.

Figure 27:
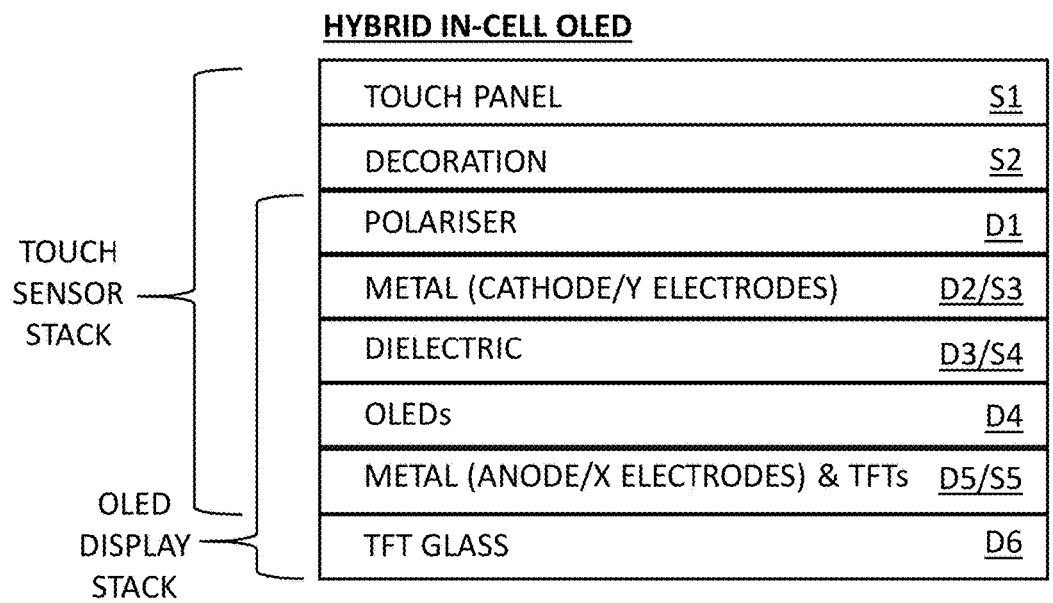
FIG. 27 shows a sensor and display stack of another hybrid in-cell OLED embodiment of the disclosure.

FIG. 27 shows a sensor and display stack of another hybrid in-cell OLED embodiment of the disclosure. The layer structure starts with a glass layer for acting as a substrate for the subsequent TFT layer which includes the TFTs and their drive electrodes, including dual function electrodes which serve as the VCOM electrodes for the OLEDs providing a reference voltage for the TFTs and the X electrodes for touch sensing. There then follows the OLED layer. A dielectric layer then follows which serves as a substrate for another metal layer comprising dual purpose electrodes to act as the cathodes for the OLEDs and the Y electrodes for sense in the touch sensor. The stack is completed with: the polariser for the display, an optional decoration layer and the touch panel. We also note that the general comments on in-cell designs made in relation to the above hybrid in-cell OLED embodiment and in-cell LCD embodiments also apply to this in-cell OLED embodiment.

It will be appreciated that the touch sensor stack of any of the on-stack embodiments may form the basis for further embodiments which do not include a display, i.e. stand-alone touch sensors, such as a touchpad of a laptop computer, or a touch-sensitive rear housing panel of a mobile phone.

Moreover, in any of the example stacks, the X and Y electrode layers could be swapped. Further, in any of the example stacks, the X and Y electrode layers could be arranged in a single layer.

A touch screen computing device (or touch sensor device without screen) as presented herein may for example be a mobile phone (smartphone), phablet, tablet including specialist drawing tablet, laptop computer, personal computer, smart television, media player, satellite navigation device, games console, kiosk computer, or point-of-sale device. The device may be a user equipment as defined by one or more telecommunications standards. The device may be portable, e.g. a handheld computing device, or fixed. The touch screen (or touch sensor without screen) may form part of a household appliance or other appliance.

Device Context Description

Figure 28B:
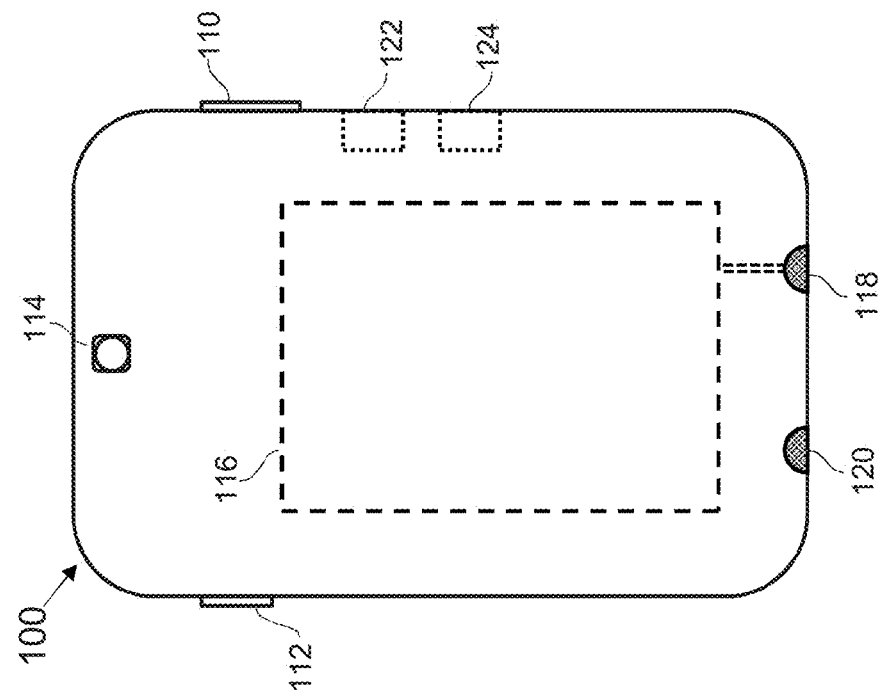
FIG. 28B is a schematic view of the rear of the handheld touch screen computing device of FIG. 28A.
Figure 28A:
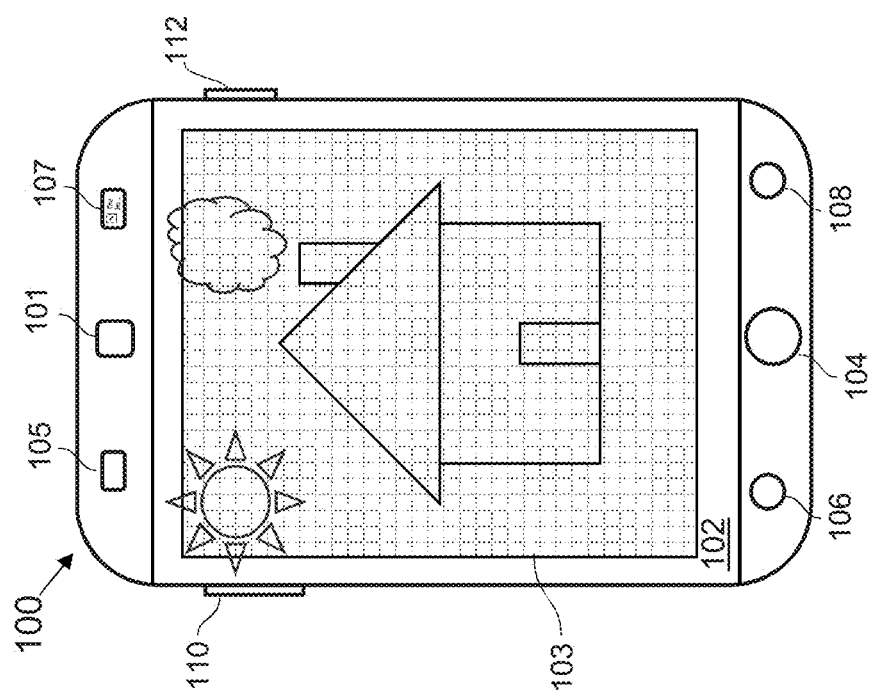
FIG. 28A is a schematic view of the front of a handheld touch screen computing device according to embodiments of the disclosure.

FIG. 28A and FIG. 28B are schematic perspective views from the front and behind of a handheld touch screen computing device.

Figure 29:
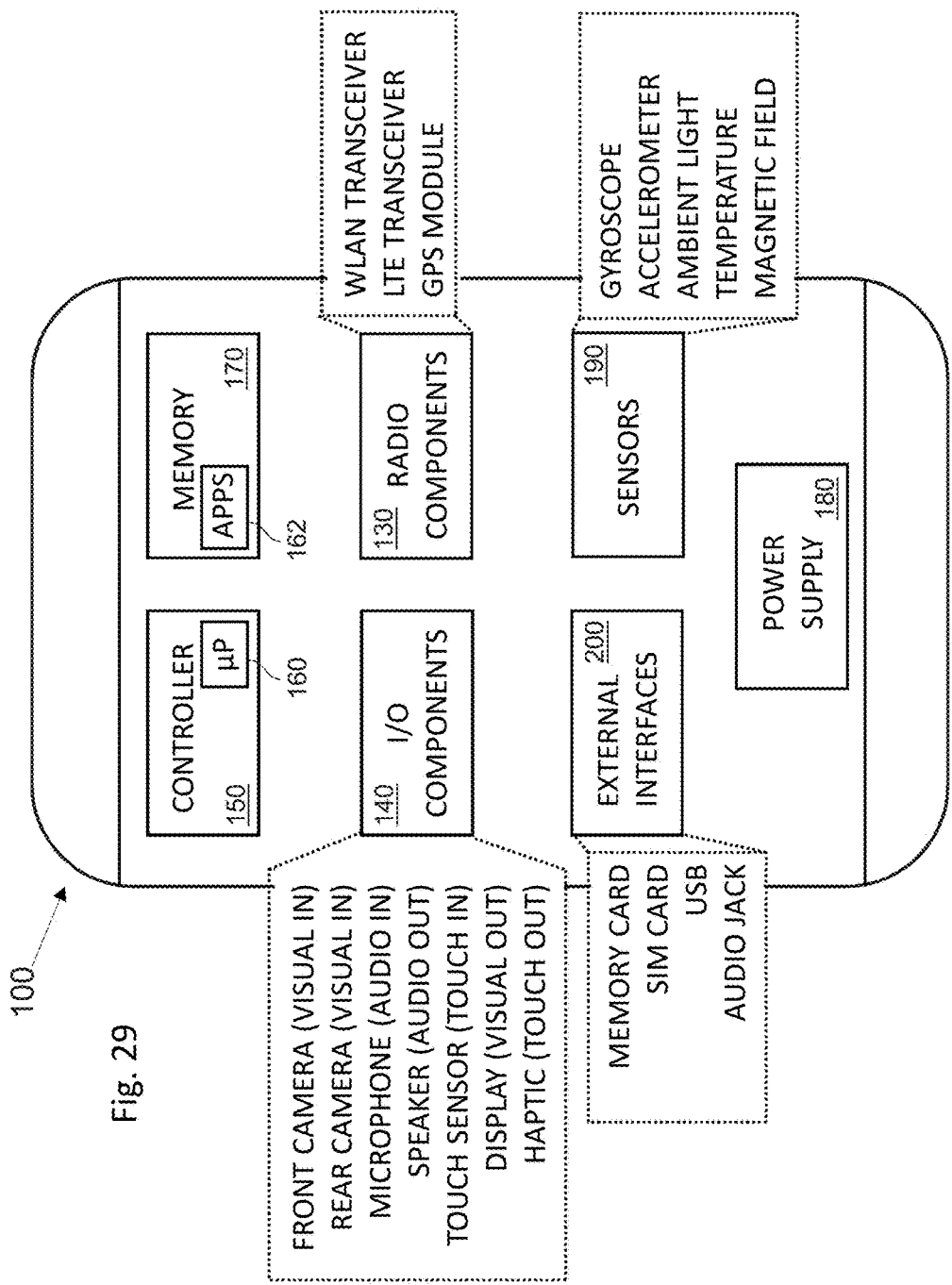
FIG. 29 is a block diagram of the functional components of the computing device of FIG. 28A and FIG. 28B.
Figure 30:
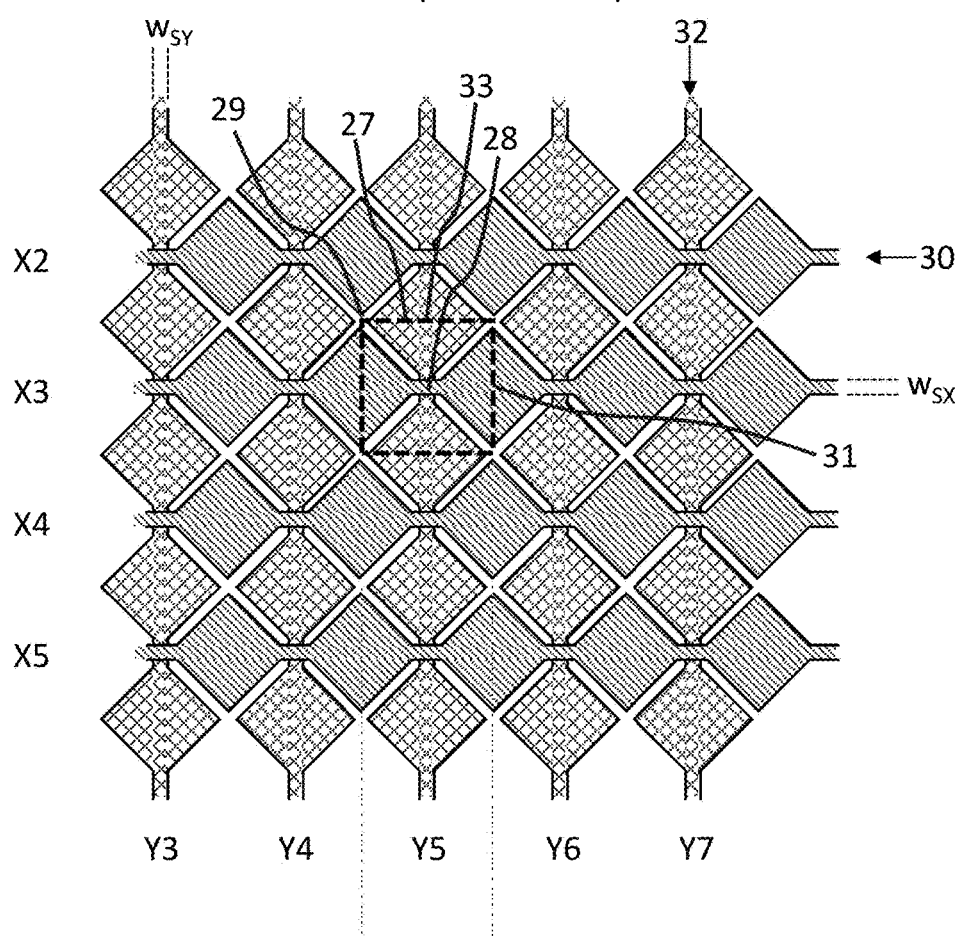
FIG. 30 shows schematically in plan view a portion of a diamond electrode pattern according to a prior art design, e.g. as disclosed in US2010/156810A1.
Figure 31A:
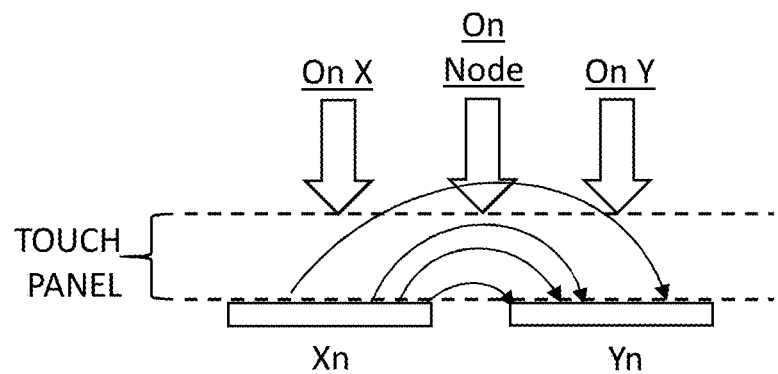
FIG. 31A is a schematic cross-section through a touch panel showing the electric field distribution during a mutual capacitance measurement.
Figure 31B:
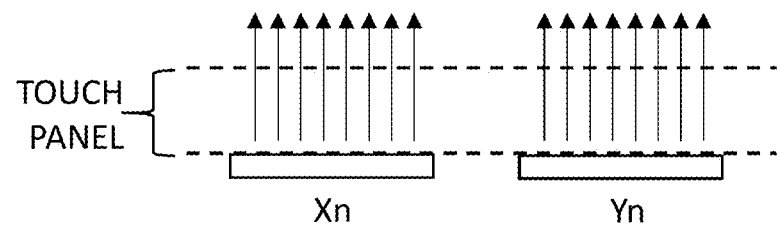
FIG. 31B is a schematic cross-section through a touch panel showing the electric field distribution during a self capacitance measurement.

FIG. 29 is a block diagram of the functional components of the computing device of FIG. 28A and FIG. 28B.

Referring to FIG. 28A, the computing device 100 has a smartphone or tablet format. The computing device 100 is arranged in a housing with a front face (facing outwards from FIG. 28A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). The touch screen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touch screen. The front face also accommodates a mechanical key (or button) 104 and two touch sensor keys (or buttons) 106, 108, on either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 28B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 29, this shows selected functional components of the computing device 100. The computing device 100 has radio components 130, input/output (I/O) components 140, one or more controllers 150 associated with one or more processors 160 and one or more memories 170, a power supply 180, sensor components 190 and external interfaces 200. The memory 170 is operable to store computer applications ('apps') 162 which comprise software code portions that are loadable into and executable by the processor 160. The controller(s) 150 may include a touch-sensor controller and a display controller, or a combined touch and display controller.

The processor(s) may comprise separate processing units for specialist tasks such as touch sensing, display drive, video processing, speech/audio analysis and/or speech/audio synthesis. The controller(s) and associated processor(s) and memory(ies) have the task of controlling the computing device and executing computer programs stored in the memory(ies). The memory(ies) may store computer applications for running on the computing device as well as collecting data from the various I/O devices. The controller(s) typically functions to control overall operation of the computing device, in addition to the operations associated with the application programs. The controller(s) processes signals, data, information and the like input or output through the above-mentioned components and/or runs application programs saved in the memory, thereby processing or providing a user with appropriate information and/or functions.

The radio components 130 includes a WLAN transceiver, an LTE transceiver, and a GPS module. The I/O components 140 include a display capable of displaying content and also acting as part of a graphical user interface, wherein the display may be based on a suitable technology such as liquid crystal or organic light emitting diodes, as well as a position-sensitive touch sensor area overlaid on, or formed as an integral part of, the display to serve as part of a graphical user interface in conjunction with the display with optionally other touch sensor areas or buttons (e.g. on the reverse side or edge (bezel) of the device housing). Further I/O components, as previously mentioned, are front and rear facing cameras for capturing stills or video images, a microphone for capturing audio, a speaker for outputting audio and a haptic output embedded in the touch screen to provide tactile feedback. The sensing components include a gyroscope, an accelerometer, an ambient light sensor, a magnetic field sensor and a temperature sensor, for example. The external interfaces may include various ports and sockets for physical connections, such as a SIM card, wired LAN connectors, memory cards, audio jack socket, USB ports and so forth.

It will be clear to one skilled in the art that many improvements and modifications can be made to the foregoing exemplary embodiment without departing from the scope of the present disclosure.

The invention claimed is:

1. A device incorporating a capacitive touch sensor, the device comprising:
 a touch panel having on an upper side a touch surface and on a lower side an internal surface, the touch panel being made of a dielectric material;
 a set of X electrodes arranged under the touch panel and having a zeroth order branch extending in an x direction; and
 a set of Y electrodes arranged under the touch panel and having a zeroth order branch extending in a y direction different from the x direction, such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3,
 wherein the ratio of the area covered by each of the X electrodes to the area covered by each of the Y electrodes is matched to lie within 20% of the aspect ratio of touch sensitive area, so that the self capacitance of each of the X electrodes and the self capacitance of each of the Y electrodes are at least approximately the same.

2. The device of claim 1, wherein the electrode area ratio is matched to lie within at least one of ±2%, ±4%, ±6%, ±8%, ±10%, ±12%, ±14%, ±16% and ±18% of the aspect ratio of the touch sensitive area.

3. The device of claim 1, wherein each node is associated with a sub-area bounded by adjacent zeroth order X and Y electrode branches, and wherein, in each sub-area, the ratio of the area covered by the X electrodes to the area covered by the Y electrodes is at least approximately the same as the inverse of the aspect ratio of the touch sensitive area.

4. The device of claim 1, wherein:
 the zeroth order branches have different widths in X and Y;
 at least one of the X and Y zeroth order branches have internal microstructure which includes micro-areas absent of conductive material that are enclosed by conductive material; and/or
 the X and Y zeroth order branches have internal microstructure which includes micro-areas absent of conductive material that are enclosed by conductive material, wherein the proportion of micro-areas in the zeroth order X and Y branches are different.

5. The device of claim 3, wherein the X and Y electrodes each further comprise higher order branches of order n, each of which is confined to the sub-area into which it buds, where order n is a positive integer and where an nth order branch buds from an (n−1)th order branch, so that, away from edges of the node array, each node is associated with four sub-areas.

6. The device of claim 5, wherein:
 the higher order branches have different widths in X and Y;

the higher order branches have different lengths in X and Y;

the higher order branches have different numbers in X and Y;

at least one of the X and Y higher order branches have internal microstructure which includes micro-areas absent of conductive material that are enclosed by conductive material; and/or the X and Y higher order branches have internal microstructure which includes micro-areas absent of conductive material that are enclosed by conductive material, wherein the proportion of micro-areas in the higher order X and Y branches are different.

7. The device of claim 5, wherein, in each sub-area, at least some of the higher order X and Y branches extend alongside one another separated by a gap suitable for making a mutual capacitance measurement of a touching object impinging on the touch surface.

8. The device of claim 7, wherein the co-extending higher order X and Y branches comprise at least one of first, second and third order branches of one of X and Y and at least one of first, second and third order branches of one of Y and X respectively.

9. The device of claim 5, wherein the zeroth and higher order branches represent macrostructure of an overall electrode pattern formed by the X and Y electrodes in a conductive material, and wherein there are further areas of said conductive material that are arranged to fill in gaps in the electrode pattern such that said further areas of said conductive material remain electrically isolated from the X and Y electrodes.

10. The device of claim 1, further comprising a display configured to operate in conjunction with a capacitive touch sensor and thereby form a touch screen.

11. A method of manufacturing a device incorporating a capacitive touch sensor, the method comprising:

providing a touch panel having on an upper side a touch surface and on a lower side an internal surface, the touch panel being made of a dielectric material;

fabricating a set of X electrodes arranged under the touch panel and having a zeroth order branch extending in an x direction; and fabricating a set of Y electrodes arranged under the touch panel and having a zeroth order branch extending in a y direction different from the x direction, such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3, wherein the ratio of the area covered by each of the X electrodes to the area covered by each of the Y electrodes is matched to lie within 20% of the aspect ratio of the touch sensitive area, so that the self capacitance of each of the X electrodes and the self capacitance of each of the Y electrodes are at least approximately the same.

12. A computer automated method for designing an electrode pattern for a capacitive touch sensor, the method comprising:

selecting an electrode pattern template relating to an electrode pattern comprising:

(a) a set of X electrodes having a zeroth order branch extending in an x direction and a plurality of higher order branches; and (b) a set of Y electrodes having a zeroth order branch extending in a y direction different from the x direction, such that the zeroth order branches of the X and Y electrodes cross each other at crossing points to form a two-dimensional array of nodes which defines a touch sensitive area, the set of Y electrodes further comprising a plurality of higher order branches, wherein at least some of the higher order X and Y branches extend alongside one another separated by a gap;

generating a specification for the desired electrode pattern which specifies:

(a) lateral dimensions in x and y directions for the touch sensitive area;

(b) a number of nodes in each of the x and y directions for the touch sensitive area which correspond to the number of Y and X electrodes respectively; and (c) at least one area parameter for the X and Y electrodes; and generating an electrode pattern by varying dimensional parameters within the electrode pattern template affecting at least one of the zeroth order and higher order branches of at least one of the X and Y electrodes in order that the generated electrode pattern meets the specification.

13. The method of claim 12, wherein the specification defines as an area parameter a desired ratio of the area covered by each of the X electrodes to the area covered by each of the Y electrodes.

14. The method of claim 13, wherein the desired ratio is unity.

15. The method of claim 12, wherein the specification defines as an area parameter a desired absolute area, or range of areas, for at least one of the X and Y electrodes.

16. The method of any of claims 12, wherein the aspect ratio of the touch sensitive area is equal to or greater than at least one of: 4:3, 3:2, 8:5, 16:9 and 8:3.

17. The method of any of claims 12, further comprising manufacturing a device incorporating a capacitive touch sensor having the generated electrode pattern.

18. A device incorporating a capacitive touch sensor connected to a touch-sensor controller, wherein the capacitive touch sensor comprises:

a touch panel having on an upper side a touch surface and on a lower side an internal surface, the touch panel being made of a dielectric material;

a set of X electrodes arranged under the touch panel and having a zeroth order branch extending in an x direction;

a set of Y electrodes arranged under the touch panel and having a zeroth order branch extending in a y direction different from the x direction, such that the zeroth order branches of the X and Y electrodes cross each other at crossing points to form a two-dimensional array of nodes which defines a touch sensitive area on the touch panel, wherein the aspect ratio of the touch sensitive area is equal to or greater than at least one of: 4:3, 3:2, 8:5, 16:9 and 8:3, wherein the touch-sensor controller comprises:

a plurality of X sensor inputs connected to the X electrodes and a plurality of Y sensor inputs connected to the Y electrodes, the X sensor inputs being operable up to a maximum X self capacitance, and the Y sensor inputs being operable up to a maximum Y self capacitance, wherein the area covered by each of the X electrodes and the area covered by each of the Y electrodes are associated with respective X and Y self capacitances which are at or below said maximum X and Y self capacitances of the X and Y sensor inputs.

\* \* \* \* \*